United States Patent
Qiao et al.

(10) Patent No.: US 10,484,073 B2
(45) Date of Patent: Nov. 19, 2019

(54) PRECODING INFORMATION COLLECTION METHOD AND TRANSMISSION DEVICE

(71) Applicant: HUAWEI TECHNOLOGIES CO., LTD., Shenzhen, Guangdong (CN)

(72) Inventors: Deli Qiao, Shenzhen (CN); Ye Wu, Shanghai (CN); Dageng Chen, Shanghai (CN); Jin Liu, Shanghai (CN)

(73) Assignee: HAUWEI TECHNOLOGIES CO., LTD., Shenzhen (CN)

( * ) Notice: Subject to any disclaimer, the term of this patent is extended or adjusted under 35 U.S.C. 154(b) by 105 days.

(21) Appl. No.: 15/625,327

(22) Filed: Jun. 16, 2017

(65) Prior Publication Data

US 2017/0288760 A1 Oct. 5, 2017

Related U.S. Application Data

(63) Continuation of application No. PCT/CN2014/094121, filed on Dec. 17, 2014.

(51) Int. Cl.
*H04B 7/06* (2006.01)
*H04L 5/00* (2006.01)

(52) U.S. Cl.
CPC .......... *H04B 7/0665* (2013.01); *H04B 7/063* (2013.01); *H04B 7/0617* (2013.01);
(Continued)

(58) Field of Classification Search
CPC .... H04B 7/0665; H04B 7/0617; H04B 7/063; H04B 7/0639; H04B 7/0695; H04L 5/0048

See application file for complete search history.

(56) References Cited

U.S. PATENT DOCUMENTS 6,483,459 B1 11/2002 Hou et al.
2011/0244877 A1* 10/2011 Farajidana ............ H04L 5/0023
455/452.2

(Continued)

FOREIGN PATENT DOCUMENTS

CN 102035619 A 4/2011
CN 102122983 A 7/2011
(Continued)

OTHER PUBLICATIONS

Noh et al., "A New Precoder Design for Blind Channel Estimation in MIMO-OFDM Systems," in IEEE Transactions on Wireless Communications, vol. 13, No. 12, pp. 7011-7024, Dec. 2014 (Year: 2014).*

(Continued)

*Primary Examiner* — Michelle M Koeth
(74) *Attorney, Agent, or Firm* — Staas & Halsey LLP

(57) ABSTRACT

Embodiments of the present invention disclose a precoding information collection method and a transmission device and relate to the communications field. A specific solution is: precoding, by a transmit side, a first pilot signal according to a first precoding matrix, and sending a precoded first pilot signal to a receive side, where the first precoding matrix is the same as a precoding matrix used for current data transmission; precoding, by the transmit side, N second pilot signals according to N second precoding matrices, and sending N precoded second pilot signals to the receive side, where N is an integer greater than or equal to 1, the second precoding matrices used for precoding the second pilot signals are different from each other, and the N second precoding matrices are different from the first precoding matrix; and receiving, by the transmit side, precoding feedback information sent by the receive side.

2 Claims, 9 Drawing Sheets

(52) U.S. Cl.
CPC ......... *H04B 7/0639* (2013.01); *H04B 7/0695* (2013.01); *H04L 5/0048* (2013.01)

(56) References Cited

U.S. PATENT DOCUMENTS

| | | | |
|---|---|---|---|
| 2013/0039345 A1 | 2/2013 | Kim et al. | |
| 2013/0070723 A1* | 3/2013 | Yie | H04B 7/0639 370/329 |
| 2013/0208681 A1 | 8/2013 | Gore et al. | |
| 2014/0078867 A1 | 3/2014 | Nakamura et al. | |
| 2015/0195020 A1* | 7/2015 | Zhu | H04B 7/0617 370/329 |
| 2015/0382205 A1* | 12/2015 | Lee | H04B 7/0417 370/329 |
| 2017/0094531 A1 | 3/2017 | Kakishima et al. | |
| 2017/0346580 A1* | 11/2017 | Astrom | H04L 25/0202 |

FOREIGN PATENT DOCUMENTS

| | | |
|---|---|---|
| CN | 103634071 A | 3/2014 |
| JP | 2014-59180 A | 4/2014 |
| JP | 2014-526217 A | 10/2014 |
| JP | 2015-185952 A | 10/2015 |
| WO | 2012/041686 A1 | 4/2012 |
| WO | 2014/116928 A1 | 7/2014 |

OTHER PUBLICATIONS

Simko et al., "Adaptive Pilot-Symbol Patterns for MIMO OFDM Systems," in IEEE Transactions on Wireless Communications, vol. 12, No. 9, pp. 4705-4715, Sep. 2013 (Year: 2013).*
Extended European Search Report dated Dec. 1, 2017 in corresponding European Patent Application No. 14908169.7, 12 pp.
International Search Report dated Sep. 21, 2015 in corresponding International Application No. PCT/CN2014/094121.
NTT DOCOMO, "High-Level Views on Elevation Beamforming and FD-MIMO," 3GPP TSG RAN WG1 Meeting #78bis, Agenda Item: 7.3.3.1, Ljubljana, Slovenia, Oct. 6-10, 2014, R1-144152, 3 pgs.
English Translation of the Japanese Office Action dated Jul. 3, 2018, in corresponding Japanese Patent Application No. 2017-532753, 5 pgs.
International Search Report dated Sep. 21, 2015 in corresponding International Patent Application No. PCT/CN2014/094121.

* cited by examiner

PRECODING INFORMATION COLLECTION METHOD AND TRANSMISSION DEVICE

CROSS REFERENCE TO RELATED APPLICATIONS

This application is a continuation of International Patent Application No. PCT/CN2014/094121, filed on Dec. 17, 2014, the disclosure of which is hereby incorporated by reference in its entirety.

TECHNICAL FIELD

The present invention relates to the communications field, and in particular, to a precoding information collection method and a transmission device.

BACKGROUND

In a multi-antenna wireless communications system, a base station generally uses a precoding matrix to transmit data. However, because a channel changes in real time or there is an error in channel information obtained by the base station, a mismatch between a precoding matrix and an actual transmission channel is caused. Signal quality of data that is transmitted according to the precoding matrix and that is received by a user is relatively low. As a result, performance of the wireless communications system is not high.

For example, a precoding matrix is computed according to a direction of arrival (English: Direction Of Arrival, DOA for short) of a terminal that is estimated by a base station. When a spacing between multiple antennas configured for the base station does not satisfy a DOA estimation requirement or coupling happens between multiple antennas, there is an error in the DOA of the terminal that is estimated by the base station. For example, at 2.6 GHz gigahertz, a maximum error in a DOA of a terminal that is estimated by a base station configured with four antennas may be up to 12 degrees. This leads to an error in a precoding matrix computed according to this DOA. In addition, when a relatively large quantity of antennas are configured for a base station, a width of a 3-dB beam formed according to a precoding matrix by the base station becomes quite small. For example, a width of a 3-dB beam formed according to a precoding matrix by a base station configured with 64 antennas is only about 1.5 degrees. Therefore, when a relatively large quantity of antennas are configured for a base station, there is an error in a precoding matrix computed by the base station according to an estimated DOA of a terminal, and a main lobe of a 3-dB beam formed according to the precoding matrix is quite narrow. That is, the 3-dB beam formed according to the precoding matrix by the base station may fail to cover the terminal. Consequently, signal quality of data received by the terminal is relatively low, leading to low performance of a wireless communications system.

Therefore, how performance of a wireless communications system is improved is an urgent problem to be resolved by persons in the art.

SUMMARY

The present invention provides a precoding information collection method and a transmission device, so as to improve performance of a wireless communications system.

To achieve the foregoing objective, the following technical solutions are used in the present invention.

According to a first aspect of the present invention, a precoding information collection method is provided, including:

precoding, by a transmit side, a first pilot signal according to a first precoding matrix, and sending a precoded first pilot signal to a receive side, where the first precoding matrix is the same as a precoding matrix used for current data transmission;

precoding, by the transmit side, N second pilot signals according to N second precoding matrices, and sending N precoded second pilot signals to the receive side, where N is an integer greater than or equal to 1, the second precoding matrices used for precoding the second pilot signals are different from each other, and the N second precoding matrices are different from the first precoding matrix; and receiving, by the transmit side, precoding feedback information sent by the receive side.

With reference to the first aspect of the present invention, in a first possible implementation, when N is equal to 1, the precoding feedback information is an acknowledgement indication used to indicate that the precoding matrix used for current data transmission is not used for next data transmission.

With reference to the first aspect of the present invention, in a second possible implementation, when N is equal to 1, the precoding feedback information is an acknowledgement indication and one or more of indexes for the N second precoding matrices, where the acknowledgement indication is used to indicate that the precoding matrix used for current data transmission is not used for next data transmission.

With reference to the first aspect of the present invention, in a third possible implementation, when N is greater than 1 and the N second pilot signals are different, the precoding feedback information is an acknowledgement indication and one or more of indexes for the N second pilot signals, where the acknowledgement indication is used to indicate that the precoding matrix used for current data transmission is not used for next data transmission.

With reference to any one of the first aspect to the third possible implementation of the first aspect of the present invention, in a fourth possible implementation, the precoding feedback information is a non-acknowledgement indication used to indicate that the precoding matrix used for current data transmission is used for next data transmission.

With reference to the first aspect of the present invention, in a fifth possible implementation, when N is greater than 1, the precoding feedback information is one or more of indexes for the first precoding matrix and the N second precoding matrices.

With reference to the first aspect of the present invention, in a sixth possible implementation, when N is greater than 1 and the N second pilot signals are different, the precoding feedback information is one or more of indexes for the first pilot signal and the N second pilot signals.

With reference to any one of the first aspect to the sixth possible implementation of the first aspect of the present invention, in a seventh possible implementation, data is transmitted between the transmit side and the receive side in a single-stream manner.

According to a second aspect of the present invention, a precoding information collection method is provided, including:

receiving, by a receive side, a precoded first pilot signal sent by a transmit side, and receiving N precoded second pilot signals sent by the transmit side, where N is an integer greater than or equal to 1;

demodulating, by the receive side, the precoded first pilot signal to obtain a first pilot signal, and demodulating the N precoded second pilot signals to obtain N second pilot signals respectively; and sending, by the receive side, precoding feedback information to the transmit side according to the first pilot signal and the N second pilot signals.

With reference to the second aspect of the present invention, in a first possible implementation, the sending, by the receive side, precoding feedback information to the transmit side according to the first pilot signal and the N second pilot signals includes:

obtaining, by the receive side, signal quality of the first pilot signal, and obtaining signal quality of each of the N second pilot signals; and sending, by the receive side, the precoding feedback information to the transmit side according to the signal quality of the first pilot signal and the signal quality of each of the N second pilot signals.

With reference to the second aspect of the present invention, in a second possible implementation, the sending, by the receive side, precoding feedback information to the transmit side according to the first pilot signal and the N second pilot signals includes:

obtaining, by the receive side, a signal capacity of the first pilot signal, and obtaining a signal capacity of each of the N second pilot signals; and sending, by the receive side, the precoding feedback information to the transmit side according to the signal capacity of the first pilot signal and the signal capacity of each of the N second pilot signals.

With reference to the first possible implementation or the second possible implementation of the second aspect of the present invention, in a third possible implementation, when N is equal to 1, if the signal quality of the first pilot signal is inferior or equal to the signal quality of the second pilot signal, or the signal capacity of the first pilot signal is less than or equal to the signal capacity of the second pilot signal, the precoding feedback information is an acknowledgement indication used to indicate that the precoding matrix used for current data transmission is not used next time the transmit side transmits data.

With reference to the first possible implementation or the second possible implementation of the second aspect of the present invention, in a fourth possible implementation, when N is greater than 1, if among the N second pilot signals, there is one or more second pilot signals having signal quality superior to the signal quality of the first pilot signal, or one or more second pilot signals having a signal capacity greater than the signal capacity of the first pilot signal, the precoding feedback information is an acknowledgement indication and an index or indexes for a second precoding matrix or second precoding matrices used for the one or more second pilot signals, where the acknowledgement indication is used to indicate that the precoding matrix used for current data transmission is not used next time the transmit side transmits data.

With reference to the first possible implementation or the second possible implementation of the second aspect of the present invention, in a fifth possible implementation, when N is greater than 1 and the N second pilot signals are different, if among the N second pilot signals, there is one or more second pilot signals having signal quality superior to the signal quality of the first pilot signal, or one or more second pilot signals having a signal capacity greater than the signal capacity of the first pilot signal, the precoding feedback information is an acknowledgement indication and an index or indexes for the one or more second pilot signals, where the acknowledgement indication is used to indicate that the precoding matrix used for current data transmission is not used next time the transmit side transmits data.

With reference to any one of the first possible implementation to the fifth possible implementation of the second aspect of the present invention, in a sixth possible implementation, if the signal quality of the first pilot signal is superior or equal to the signal quality of the second pilot signal, or the signal capacity of the first pilot signal is greater than or equal to the signal capacity of the second pilot signal, the precoding feedback information is a non-acknowledgement indication used to indicate that the precoding matrix used for current data transmission is used next time the transmit side transmits data.

With reference to any one of the second aspect to the second possible implementation of the second aspect of the present invention, in a seventh possible implementation, when N is greater than 1, the precoding feedback information is one or more of an index for a first precoding matrix used for the first pilot signal and indexes for second precoding matrices used for the N second pilot signals.

With reference to any one of the second aspect to the second possible implementation of the second aspect of the present invention, in an eighth possible implementation, when N is greater than 1 and the N second pilot signals are different, the precoding feedback information is one or more of indexes for the first pilot signal and the N second pilot signals.

With reference to any one of the second aspect to the eighth possible implementation of the second aspect of the present invention, in a ninth possible implementation, data is transmitted between the transmit side and the receive side in a single-stream manner.

According to a third aspect of the present invention, a precoding information collection method applied to a transmit side is provided, where there are M data streams used for data transmission between the transmit side and at least one receive side, and M is an integer greater than 1; and the method includes:

precoding, by the transmit side, a first pilot signal group according to a first precoding matrix, and sending a precoded first pilot signal group to the receive side, where the first precoding matrix includes M first precoding vectors that are different from each other, the first pilot signal group includes M first pilot signals, and the first precoding matrix is the same as a precoding matrix used for current data transmission;

precoding, by the transmit side, i second pilot signal groups according to i second precoding matrices respectively, and sending i precoded second pilot signal groups to the receive side, where the $i^{th}$ second precoding matrix includes $A_i$ second precoding vectors that are different from each other, the $i^{th}$ second pilot signal group includes $A_i$ second pilot signals, i is an integer greater than or equal to 1, $A_i$ is an integer greater than or equal to 1, the second precoding matrices used for precoding the second pilot signal groups are different from each other, and the i second precoding matrices are different from the first precoding matrix; and receiving, by the transmit side, precoding feedback information sent by the receive side.

With reference to the third aspect of the present invention, in a first possible implementation, when i is equal to 1, the precoding feedback information is an acknowledgement indication used to indicate that the precoding matrix used for current data transmission is not used for next data transmission.

With reference to the third aspect of the present invention, in a second possible implementation, when i is greater than 1, the precoding feedback information is an acknowledgement indication and one or more of indexes for the i second precoding matrices, where the acknowledgement indication is used to indicate that the precoding matrix used for current data transmission is not used for next data transmission.

With reference to the third aspect of the present invention, in a third possible implementation, when i is greater than 1 and the i second pilot signal groups are different, the precoding feedback information is an acknowledgement indication and one or more of indexes for the i second pilot signal groups, where the acknowledgement indication is used to indicate that the precoding matrix used for current data transmission is not used for next data transmission.

With reference to any one of the third aspect to the third possible implementation of the third aspect of the present invention, in a fourth possible implementation, the precoding feedback information is a non-acknowledgement indication used to indicate that the precoding matrix used for current data transmission is used for next data transmission.

With reference to the third aspect of the present invention, in a fifth possible implementation, when i is greater than 1, the precoding feedback information is one or more of indexes for the first precoding matrix and the i second precoding matrices.

With reference to the third aspect of the present invention, in a sixth possible implementation, when i is greater than 1 and the i second pilot signal groups are different, the precoding feedback information is one or more of indexes for the first pilot signal group and the i second pilot signal groups.

With reference to the third aspect of the present invention, in a seventh possible implementation, the precoding feedback information is indexes for B precoding vectors of precoding vectors used for the M first pilot signals and precoding vectors used for $$\sum_i A_i$$

second pilot signals, where B is an integer that is greater than or equal to 1 and less than or equal to $$\sum_i A_i + M.$$

With reference to the third aspect of the present invention, in an eighth possible implementation, the precoding feedback information is indexes for B pilot signals of the M first pilot signals and $$\sum_i A_i$$

second pilot signals, where B is an integer that is greater than or equal to 1 and less than or equal to $$\sum_i A_i + M.$$

According to a fourth aspect of the present invention, a precoding information collection method applied to a receive side is provided, where there are M data streams used for data transmission between the receive side and a transmit side, and M is an integer greater than 1; and the method includes:

receiving, by the receive side, a precoded first pilot signal group sent by the transmit side, and receiving i precoded second pilot signal groups sent by the transmit side, where i is an integer greater than or equal to 1;

demodulating, by the receive side, the precoded first pilot signal group to obtain a first pilot signal group, and demodulating the i precoded second pilot signal groups to obtain i second pilot signal groups respectively; and sending, by the receive side, precoding feedback information to the transmit side according to the first pilot signal group and the i second pilot signal groups.

With reference to the fourth aspect of the present invention, in a first possible implementation, the first pilot signal group includes M first pilot signals, and the $i^{th}$ second pilot signal group includes $A_i$ second pilot signals; and the sending, by the receive side, precoding feedback information to the transmit side according to the first pilot signal group and the i second pilot signal groups includes:

obtaining, by the receive side, signal quality of the M first pilot signals in the first pilot signal group, and obtaining signal quality of $$\sum_i A_i$$

second pilot signals in the i second pilot signal groups; and selecting, by the receive side, B pilot signals according to signal quality of all of the first pilot signals and signal quality of all of the second pilot signals, and sending the precoding feedback information to the transmit side according to the B pilot signals, where B is an integer that is greater than or equal to 1 and less than or equal to $$\sum_i A_i + M.$$

With reference to the fourth aspect of the present invention, in a second possible implementation, the sending, by the receive side, precoding feedback information to the transmit side according to the first pilot signal group and the i second pilot signal groups includes:

obtaining, by the receive side, a signal capacity of the first pilot signal group, and obtaining a signal capacity of each of the i second pilot signal groups; and sending, by the receive side, the precoding feedback information to the transmit side according to the signal capacity of the first pilot signal group and the signal capacity of each of the i second pilot signal groups.

With reference to the second possible implementation of the fourth aspect of the present invention, in a third possible implementation, when i is equal to 1, if the signal capacity of the first pilot signal group is less than or equal to the signal capacity of the second pilot signal group, the precoding feedback information is an acknowledgement indication used to indicate that the precoding matrix used for current data transmission is not used next time the transmit side transmits data.

With reference to the second possible implementation of the fourth aspect of the present invention, in a fourth possible implementation, when i is greater than 1, if among the i second pilot signal groups, there is one or more second pilot signal groups having a signal capacity greater than the signal capacity of the first pilot signal group, the precoding feedback information is an acknowledgement indication and an index or indexes for a second precoding matrix or second precoding matrices used for the one or more second pilot signal groups, where the acknowledgement indication is used to indicate that the precoding matrix used for current data transmission is not used next time the transmit side transmits data.

With reference to the second possible implementation of the fourth aspect of the present invention, in a fifth possible implementation, when i is greater than 1 and the i second pilot signal groups are different, if among the i second pilot signal groups, there is one or more second pilot signal groups having a signal capacity greater than the signal capacity of the first pilot signal group, the precoding feedback information is an acknowledgement indication and an index or indexes for the one or more second pilot signal groups, where the acknowledgement indication is used to indicate that the precoding matrix used for current data transmission is not used next time the transmit side transmits data.

With reference to any one of the second possible implementation to the fifth possible implementation of the fourth aspect of the present invention, in a sixth possible implementation, if the signal capacity of the first pilot signal group is greater than or equal to the signal capacity of the second pilot signal group, the precoding feedback information is a non-acknowledgement indication used to indicate that the precoding matrix used for current data transmission is used next time the transmit side transmits data.

With reference to either the fourth aspect or the second possible implementation of the fourth aspect of the present invention, in a seventh possible implementation, when i is greater than 1, the precoding feedback information is one or more of an index for the first precoding matrix used for the first pilot signal group and indexes for the second precoding matrices used for the i second pilot signal groups.

With reference to either the fourth aspect or the second possible implementation of the fourth aspect of the present invention, in an eighth possible implementation, when i is greater than 1 and the i second pilot signal groups are different, the precoding feedback information is one or more of indexes for the first pilot signal group and the i second pilot signal groups.

With reference to the first possible implementation of the fourth aspect of the present invention, in a ninth possible implementation, the precoding feedback information is indexes for B precoding vectors of precoding vectors used for the M first pilot signals and precoding vectors used for the $$\sum_i A_i$$

second pilot signals.

With reference to the first possible implementation of the fourth aspect of the present invention, in a tenth possible implementation, the precoding feedback information is indexes for B pilot signals of the M first pilot signals and the $$\sum_i A_i$$

second pilot signals.

According to a fifth aspect of the present invention, a transmit side is provided, where the transmit side includes a processor, a transmitter, and a receiver;

the processor is configured to precode a first pilot signal according to a first precoding matrix, where the first precoding matrix is the same as a precoding matrix used for current data transmission;

the transmitter is configured to send, to a receive side, a precoded first pilot signal obtained by the processor;

the processor is further configured to precode N second pilot signals according to N second precoding matrices, where N is an integer greater than or equal to 1, the second precoding matrices used for precoding the second pilot signals are different from each other, and the N second precoding matrices are different from the first precoding matrix;

the transmitter is further configured to send, to the receive side, N precoded second pilot signals obtained by the processor; and the receiver is configured to receive precoding feedback information sent by the receive side.

With reference to the fifth aspect of the present invention, in a first possible implementation, when N is equal to 1, the precoding feedback information is an acknowledgement indication used to indicate that the precoding matrix used for current data transmission is not used for next data transmission.

With reference to the fifth aspect of the present invention, in a second possible implementation, when N is greater than 1, the precoding feedback information is an acknowledgement indication and one or more of indexes for the N second precoding matrices, where the acknowledgement indication is used to indicate that the precoding matrix used for current data transmission is not used for next data transmission.

With reference to the fifth aspect of the present invention, in a third possible implementation, when N is greater than 1 and the N second pilot signals are different, the precoding feedback information is an acknowledgement indication and one or more of indexes for the N second pilot signals, where the acknowledgement indication is used to indicate that the precoding matrix used for current data transmission is not used for next data transmission.

With reference to any one of the fifth aspect to the third possible implementation of the fifth aspect of the present invention, in a fourth possible implementation, the precoding feedback information is a non-acknowledgement indication used to indicate that the precoding matrix used for current data transmission is used for next data transmission.

With reference to the fifth aspect of the present invention, in a fifth possible implementation, when N is greater than 1, the precoding feedback information is one or more of indexes for the first precoding matrix and the N second precoding matrices.

With reference to the fifth aspect of the present invention, in a sixth possible implementation, when N is greater than 1 and the N second pilot signals are different, the precoding feedback information is one or more of indexes for the first pilot signal and the N second pilot signals.

With reference to any one of the fifth aspect to the sixth possible implementation of the fifth aspect of the present invention, in a seventh possible implementation, data is transmitted between the transmit side and the receive side in a single-stream manner.

According to a sixth aspect of the present invention, a receive side is provided, where the receive side includes a receiver, a processor, and a transmitter;

the receiver is configured to receive a precoded first pilot signal sent by a transmit side, and receive N precoded second pilot signals sent by the transmit side, where N is an integer greater than or equal to 1;

the processor is configured to demodulate the precoded first pilot signal received by the receiver to obtain a first pilot signal, and demodulate the N precoded second pilot signals received by the receiver to obtain N second pilot signals respectively; and the transmitter is configured to send precoding feedback information to the transmit side according to the first pilot signal and the N second pilot signals that are obtained by the processor.

With reference to the sixth aspect of the present invention, in a first possible implementation, the transmitter is specifically configured to: obtain signal quality of the first pilot signal, and obtain signal quality of each of the N second pilot signals; and send the precoding feedback information to the transmit side according to the signal quality of the first pilot signal and the signal quality of each of the N second pilot signals.

With reference to the sixth aspect of the present invention, in a second possible implementation, the transmitter is specifically configured to: obtain a signal capacity of the first pilot signal, and obtain a signal capacity of each of the N second pilot signals; and send the precoding feedback information to the transmit side according to the signal capacity of the first pilot signal and the signal capacity of each of the N second pilot signals.

With reference to the first possible implementation or the second possible implementation of the sixth aspect of the present invention, in a third possible implementation, when N is equal to 1, if the signal quality of the first pilot signal is inferior or equal to the signal quality of the second pilot signal, or the signal capacity of the first pilot signal is less than or equal to the signal capacity of the second pilot signal, the precoding feedback information is an acknowledgement indication used to indicate that the precoding matrix used for current data transmission is not used next time the transmit side transmits data.

With reference to the first possible implementation or the second possible implementation of the sixth aspect of the present invention, in a fourth possible implementation, when N is greater than 1, if among the N second pilot signals, there is one or more second pilot signals having signal quality superior to the signal quality of the first pilot signal, or one or more second pilot signals having a signal capacity greater than the signal capacity of the first pilot signal, the precoding feedback information is an acknowledgement indication and an index or indexes for a second precoding matrix or second precoding matrices used for the one or more second pilot signals, where the acknowledgement indication is used to indicate that the precoding matrix used for current data transmission is not used next time the transmit side transmits data.

With reference to the first possible implementation or the second possible implementation of the sixth aspect of the present invention, in a fifth possible implementation, when N is greater than 1 and the N second pilot signals are different, if among the N second pilot signals, there is one or more second pilot signals having signal quality superior to the signal quality of the first pilot signal, or one or more second pilot signals having a signal capacity greater than the signal capacity of the first pilot signal, the precoding feedback information is an acknowledgement indication and an index or indexes for the one or more second pilot signals, where the acknowledgement indication is used to indicate that the precoding matrix used for current data transmission is not used next time the transmit side transmits data.

With reference to any one of the first possible implementation to the fifth possible implementation of the sixth aspect of the present invention, in a sixth possible implementation, if the signal quality of the first pilot signal is superior or equal to the signal quality of the second pilot signal, or the signal capacity of the first pilot signal is greater than or equal to the signal capacity of the second pilot signal, the precoding feedback information is a non-acknowledgement indication used to indicate that the precoding matrix used for current data transmission is used next time the transmit side transmits data.

With reference to any one of the sixth aspect to the second possible implementation of the sixth aspect of the present invention, in a seventh possible implementation, when N is greater than 1, the precoding feedback information is one or more of an index for a first precoding matrix used for the first pilot signal and indexes for second precoding matrices used for the N second pilot signals.

With reference to any one of the sixth aspect to the second possible implementation of the sixth aspect of the present invention, in an eighth possible implementation, when N is greater than 1 and the N second pilot signals are different, the precoding feedback information is one or more of indexes for the first pilot signal and the N second pilot signals.

With reference to any one of the sixth aspect to the eighth possible implementation of the sixth aspect of the present invention, in a ninth possible implementation, data is transmitted between the transmit side and the receive side in a single-stream manner.

According to a seventh aspect of the present invention, a transmit side is provided, where there are M data streams used for data transmission between the transmit side and at least one receive side, and M is an integer greater than 1; and the transmit side includes a processor, a transmitter, and a receiver;

the processor is configured to precode a first pilot signal group according to a first precoding matrix, where the first precoding matrix includes M first precoding vectors that are different from each other, the first pilot signal group includes M first pilot signals, and the first precoding matrix is the same as a precoding matrix used for current data transmission;

the transmitter is configured to send, to the receive side, a precoded first pilot signal group obtained by the processor;

the processor is further configured to precode i second pilot signal groups according to i second precoding matrices respectively, where the $i^{th}$ second precoding matrix includes $A_i$ second precoding vectors that are different from each other, the $i^{th}$ second pilot signal group includes $A_i$ second pilot signals, i is an integer greater than or equal to 1, $A_i$ is an integer greater than or equal to 1, the second precoding matrices used for precoding the second pilot signal groups are different from each other, and the i second precoding matrices are different from the first precoding matrix;

the transmitter is further configured to send, to the receive side, i precoded second pilot signal groups obtained by the processor; and the receiver is configured to receive precoding feedback information sent by the receive side.

With reference to the seventh aspect of the present invention, in a first possible implementation, when i is equal to 1, the precoding feedback information is an acknowledgement indication used to indicate that the precoding matrix used for current data transmission is not used for next data transmission.

With reference to the seventh aspect of the present invention, in a second possible implementation, when i is greater than 1, the precoding feedback information is an acknowledgement indication and one or more of indexes for the i second precoding matrices, where the acknowledgement indication is used to indicate that the precoding matrix used for current data transmission is not used for next data transmission.

With reference to the seventh aspect of the present invention, in a third possible implementation, when i is greater than 1 and the i second pilot signal groups are different, the precoding feedback information is an acknowledgement indication and one or more of indexes for the i second pilot signal groups, where the acknowledgement indication is used to indicate that the precoding matrix used for current data transmission is not used for next data transmission.

With reference to any one of the seventh aspect to the third possible implementation of the seventh aspect of the present invention, in a fourth possible implementation, the precoding feedback information is a non-acknowledgement indication used to indicate that the precoding matrix used for current data transmission is used for next data transmission.

With reference to the seventh aspect of the present invention, in a fifth possible implementation, when i is greater than 1, the precoding feedback information is one or more of indexes for the first precoding matrix and the i second precoding matrices.

With reference to the seventh aspect of the present invention, in a sixth possible implementation, when i is greater than 1 and the i second pilot signal groups are different, the precoding feedback information is one or more of indexes for the first pilot signal group and the i second pilot signal groups.

With reference to the seventh aspect of the present invention, in a seventh possible implementation, the precoding feedback information is indexes for B precoding vectors of precoding vectors used for the M first pilot signals and precoding vectors used for $$\sum_i A_i$$

second pilot signals, where B is an integer that is greater than or equal to 1 and less than or equal to $$\sum_i A_i + M.$$

With reference to the seventh aspect of the present invention, in an eighth possible implementation, the precoding feedback information is indexes for B pilot signals of the M first pilot signals and $$\sum_i A_i$$

second pilot signals, where B is an integer that is greater than or equal to 1 and less than or equal to $$\sum_i A_i + M.$$

According to an eighth aspect of the present invention, a receive side is provided, where there are M data streams used for data transmission between the receive side and a transmit side, and M is an integer greater than 1; and the receive side includes a receiver, a processor, and a transmitter;

the receiver is configured to receive a precoded first pilot signal group sent by the transmit side, and receive i precoded second pilot signal groups sent by the transmit side, where i is an integer greater than or equal to 1;

the processor is configured to demodulate the precoded first pilot signal group received by the receiver to obtain a first pilot signal group, and demodulate the i precoded second pilot signal groups received by the receiver to obtain i second pilot signal groups respectively; and the transmitter is configured to send precoding feedback information to the transmit side according to the first pilot signal group and the i second pilot signal groups that are obtained by the processor.

With reference to the eighth aspect of the present invention, in a first possible implementation, the first pilot signal group includes M first pilot signals, and the $i^{th}$ second pilot signal group includes $A_i$ second pilot signals; and the transmitter is specifically configured to obtain signal quality of the M first pilot signals in the first pilot signal group, and obtain signal quality of $$\sum_i A_i$$

second pilot signals in the i second pilot signal groups; and select B pilot signals according to signal quality of all of the first pilot signals and signal quality of all of the second pilot signals, and send the precoding feedback information to the transmit side according to the B pilot signals, where B is an integer that is greater than or equal to 1 and less than or equal to $$\sum_i A_i + M.$$

With reference to the eighth aspect of the present invention, in a second possible implementation, the transmitter is specifically configured to: obtain a signal capacity of the first pilot signal group, and obtain a signal capacity of each of the i second pilot signal groups; and send the precoding feedback information to the transmit side according to the signal capacity of the first pilot signal group and the signal capacity of each of the i second pilot signal groups.

With reference to the second possible implementation of the eighth aspect of the present invention, in a third possible implementation, when i is equal to 1, if the signal capacity of the first pilot signal group is less than or equal to the signal capacity of the second pilot signal group, the precoding feedback information is an acknowledgement indication used to indicate that the precoding matrix used for current data transmission is not used next time the transmit side transmits data.

With reference to the second possible implementation of the eighth aspect of the present invention, in a fourth possible implementation, when i is greater than 1, if among the i second pilot signal groups, there is one or more second pilot signal groups having a signal capacity greater than the signal capacity of the first pilot signal group, the precoding feedback information is an acknowledgement indication and an index or indexes for a second precoding matrix or second precoding matrices used for the one or more second pilot signal groups, where the acknowledgement indication is used to indicate that the precoding matrix used for current data transmission is not used next time the transmit side transmits data.

With reference to the second possible implementation of the eighth aspect of the present invention, in a fifth possible implementation, when i is greater than 1 and the i second pilot signal groups are different, if among the i second pilot signal groups, there is one or more second pilot signal groups having a signal capacity greater than the signal capacity of the first pilot signal group, the precoding feedback information is an acknowledgement indication and an index or indexes for the one or more second pilot signal groups, where the acknowledgement indication is used to indicate that the precoding matrix used for current data transmission is not used next time the transmit side transmits data.

With reference to any one of the second possible implementation to the fifth possible implementation of the eighth aspect of the present invention, in a sixth possible implementation, if the signal capacity of the first pilot signal group is greater than or equal to the signal capacity of the second pilot signal group, the precoding feedback information is a non-acknowledgement indication used to indicate that the precoding matrix used for current data transmission is used next time the transmit side transmits data.

With reference to either the eighth aspect or the second possible implementation of the eighth aspect of the present invention, in a seventh possible implementation, when i is greater than 1, the precoding feedback information is one or more of an index for the first precoding matrix used for the first pilot signal group and indexes for the second precoding matrices used for the i second pilot signal groups.

With reference to either the eighth aspect or the second possible implementation of the eighth aspect of the present invention, in an eighth possible implementation, when i is greater than 1 and the i second pilot signal groups are different, the precoding feedback information is one or more of indexes for the first pilot signal group and the i second pilot signal groups.

With reference to the first possible implementation of the eighth aspect of the present invention, in a ninth possible implementation, the precoding feedback information is indexes for B precoding vectors of precoding vectors used for the M first pilot signals and precoding vectors used for the $$\sum_i A_i$$

second pilot signals.

With reference to the first possible implementation of the eighth aspect of the present invention, in a tenth possible implementation, the precoding feedback information is indexes for B pilot signals of the M first pilot signals and the $$\sum_i A_i$$

second pilot signals.

According to the precoding information collection method and the transmission device that are provided by embodiments of the present invention, a transmit side sends, to a receive side, a first pilot signal precoded by using a first precoding matrix and N second pilot signals precoded by using N second precoding matrices, and receives precoding feedback information sent by the receive side. This enables the transmit side to adaptively adjust a precoding matrix used for data transmission, according to the precoding feedback information that is sent by the receive side and used to recommend a precoding matrix for the transmit side to transmit data, and further makes the precoding matrix used for data transmission match an actual data transmission channel. In this way, performance of a wireless communications system is improved.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A precoding information collection method provided in the embodiments of the present invention is applied to a multi-antenna communications system. The multi-antenna communications system includes a transmit side and a receive side. In a possible implementation, data is transmitted between a transmit side and a receive side in a single-stream manner. In another possible implementation, data is transmitted between a transmit side and at least one receive side in a multistream manner. For ease of understanding by persons skilled in the art, the following describes the foregoing two implementations separately. Details are as follows.

Figure 1:
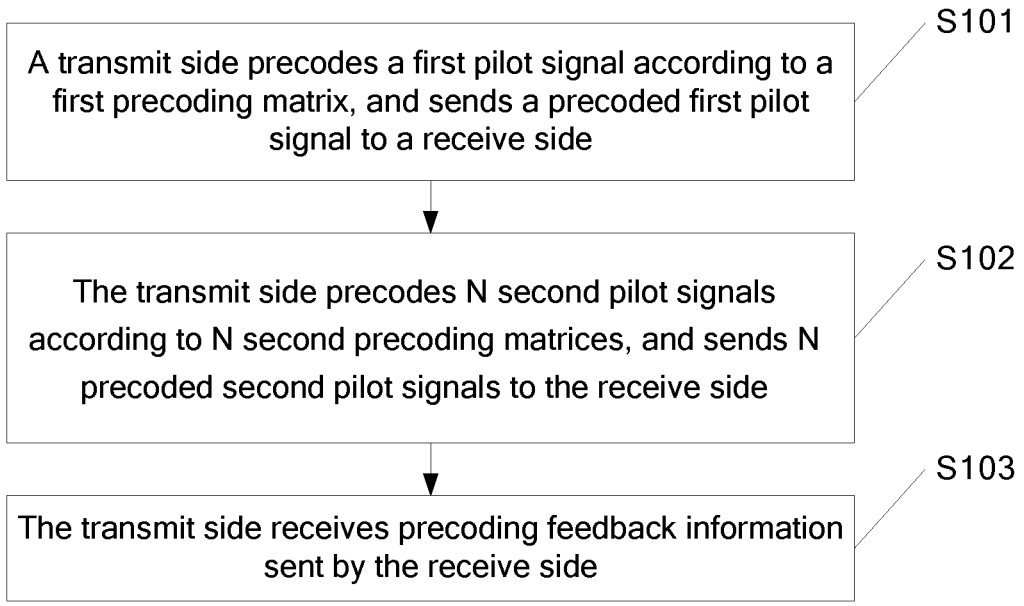
FIG. 1 is a flowchart of a precoding information collection method according to an embodiment of the present invention.

An embodiment of the present invention provides a precoding information collection method. As shown in FIG. 1, the method may include the following steps.

S101: A transmit side precodes a first pilot signal according to a first precoding matrix, and sends a precoded first pilot signal to a receive side.

The first precoding matrix is the same as a precoding matrix used for current data transmission.

S102: The transmit side precodes N second pilot signals according to N second precoding matrices, and sends N precoded second pilot signals to the receive side.

N is an integer greater than or equal to 1, the second precoding matrices used for precoding the second pilot signals are different from each other, and the N second precoding matrices are different from the first precoding matrix.

S103: The transmit side receives precoding feedback information sent by the receive side.

The precoding feedback information may be understood as information related to a precoding matrix that the receive side recommends the transmit side to use for next data transmission.

According to the precoding information collection method provided by this embodiment of the present invention, a transmit side sends, to a receive side, a first pilot signal precoded by using a first precoding matrix and N second pilot signals precoded by using N second precoding matrices, and receives precoding feedback information sent by the receive side. This enables the transmit side to adaptively adjust a precoding matrix used for data transmission, according to the precoding feedback information that is sent by the receive side and used to recommend a precoding matrix for the transmit side to transmit data, and further makes the precoding matrix used for data transmission match an actual data transmission channel. In this way, performance of a wireless communications system is improved.

Further, when the quantity of second precoding matrices, N, in S102 is equal to 1, the precoding feedback information received by the transmit side in S103 is an acknowledgement indication.

The acknowledgement indication is used to indicate that the precoding matrix used for current data transmission is not used for next data transmission.

Further, when the quantity of second precoding matrices, N, in S102 is equal to 1, the precoding feedback information received by the transmit side in S103 is an acknowledgement indication and one or more of indexes for the N second precoding matrices.

Further, when the quantity of second precoding matrices, N, in S102 is equal to 1 and the N second pilot signals are different, the precoding feedback information received by the transmit side in S103 is an acknowledgement indication and one or more of indexes for the N second pilot signals.

Further, the precoding feedback information received by the transmit side in S103 is a non-acknowledgement indication.

The non-acknowledgement indication is used to indicate that the precoding matrix used for current data transmission is used for next data transmission.

Further, when the quantity of second precoding matrices, N, in S102 is greater than 1, the precoding feedback information received by the transmit side in S103 is one or more of indexes for the first precoding matrix and the N second precoding matrices.

Further, when the quantity of second precoding matrices, N, in S102 is greater than 1 and the N second pilot signals are different, the precoding feedback information received by the transmit side in S103 is one or more of indexes for the first pilot signal and the N second pilot signals.

Further, in this embodiment of the present invention, data is transmitted between the transmit side and the receive side in a single-stream manner.

Figure 2:
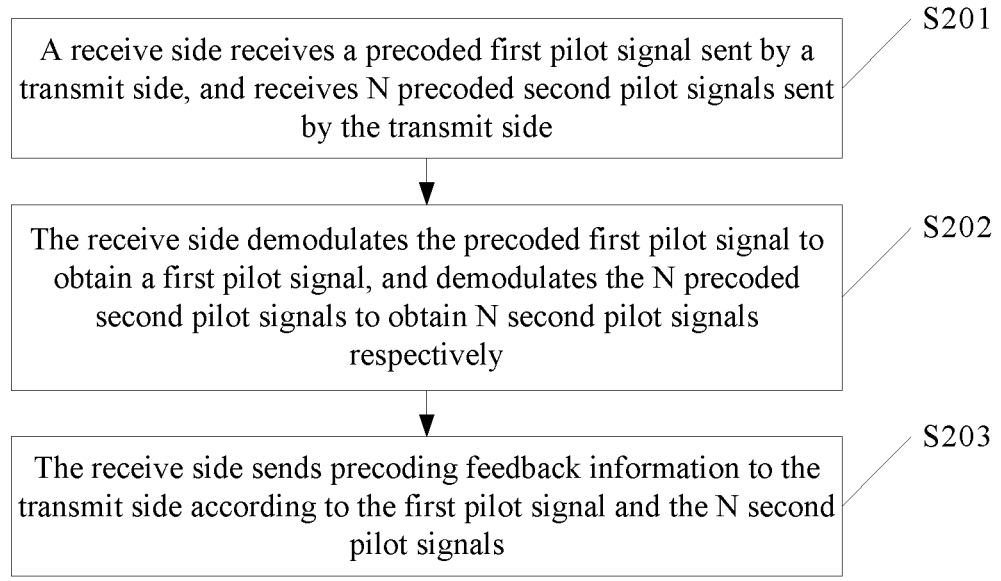
FIG. 2 is a flowchart of a precoding information collection method according to another embodiment of the present invention.

Another embodiment of the present invention provides a precoding information collection method. As shown in FIG. 2, the method may include the following steps.

S201: A receive side receives a precoded first pilot signal sent by a transmit side, and receives N precoded second pilot signals sent by the transmit side.

N is an integer greater than or equal to 1.

S202: The receive side demodulates the precoded first pilot signal to obtain a first pilot signal, and demodulates the N precoded second pilot signals to obtain N second pilot signals respectively.

S203: The receive side sends precoding feedback information to the transmit side according to the first pilot signal and the N second pilot signals.

According to the precoding information collection method provided by this embodiment of the present invention, after receiving a precoded first pilot signal and N precoded second pilot signals that are sent by a transmit side, a receive side demodulates the precoded first pilot signal to obtain a first pilot signal, and demodulates the N precoded second pilot signals to obtain N second pilot signals respectively; and sends, to the transmit side according to the first pilot signal and the N second pilot signals that are obtained, precoding feedback information used to recommend a precoding matrix for the transmit side to transmit data. This enables the transmit side to adaptively adjust, according to the precoding feedback information sent by the receive side, a precoding matrix used for data transmission, and further makes the precoding matrix used for data transmission match an actual data transmission channel. In this way, performance of a wireless communications system is improved.

Further, in a possible implementation, S203 may be specifically: The receive side obtains signal quality of the first pilot signal, and obtains signal quality of each of the N second pilot signals; and sends the precoding feedback information to the transmit side according to the obtained signal quality of the first pilot signal and the obtained signal quality of each of the N second pilot signals.

For example, an indicator measuring signal quality of a pilot signal may be a received signal level, a signal to interference plus noise ratio (English: Signal to Interference plus Noise Ratio, SINR for short) of the signal, or the like. A process of obtaining by the receive side the signal quality of the first pilot signal and the signal quality of the second pilot signal is described using an example in which an indicator measuring signal quality of a pilot signal is an SINR of the signal: The receive side separately measures a power $P_{RS}$ and an interference signal power $P_I$ of the first pilot signal on a resource element occupied by the first pilot signal and measures a system noise power $P_N$, and then can the SNR of the first pilot signal according to $P_{RS}/(P_I+P_N)$. Similarly, the receive side can obtain the signal quality of the second pilot signal with reference to the process of obtaining the signal quality of the first pilot signal.

Further, in another possible implementation, S203 may be specifically: The receive side obtains a signal capacity of the first pilot signal, and obtains a signal capacity of each of the N second pilot signals; and sends the precoding feedback information to the transmit side according to the obtained signal capacity of the first pilot signal and the obtained signal capacity of each of the N second pilot signals.

For example, an indicator measuring a signal capacity of a pilot signal may be a throughput, an allowed maximum user quantity, or the like. A process of obtaining by the receive side the signal capacity of the first pilot signal and the signal capacity of the second pilot signal is described using an example in which an indicator measuring a signal capacity of a pilot signal is a throughput: The receive side can obtain a throughput of the first pilot signal by using an indicator such as a received level or an SINR of the first pilot signal. Similarly, the receive side can obtain the signal capacity of the second pilot signal with reference to the process of obtaining the signal capacity of the first pilot signal.

Further, when N is equal to 1, if the receive side determines that the signal quality of the first pilot signal is inferior or equal to the signal quality of the second pilot signal, or the receive side determines that the signal capacity of the first pilot signal is less than or equal to the signal capacity of the second pilot signal, the precoding feedback information sent to the transmit side by the receive side is an acknowledgement indication.

The acknowledgement indication is used to indicate that the precoding matrix used for current data transmission is not used next time the transmit side transmits data.

Further, when N is greater than 1, if the receive side determines that, among the N second pilot signals, there is one or more second pilot signals having signal quality superior to the signal quality of the first pilot signal, or the receive side determines that, among the N second pilot signals, there is one or more second pilot signals having a signal capacity greater than the signal capacity of the first pilot signal, the precoding feedback information sent to the transmit side by the receive side is an acknowledgement indication and an index or indexes for a second precoding matrix or second precoding matrices used for the one or more second pilot signals.

The acknowledgement indication is used to indicate that the precoding matrix used for current data transmission is not used next time the transmit side transmits data.

Further, when N is greater than 1 and the N second pilot signals are different, if the receive side determines that, among the N second pilot signals, there is one or more second pilot signals having signal quality superior to the signal quality of the first pilot signal, or the receive side determines that, among the N second pilot signals, there is one or more second pilot signals having a signal capacity greater than the signal capacity of the first pilot signal, the precoding feedback information sent to the transmit side by the receive side is an acknowledgement indication and an index or indexes for the one or more second pilot signals.

Further, if the receive side determines that the signal quality of the first pilot signal is superior or equal to the signal quality of the second pilot signal, or the receive side determines that the signal capacity of the first pilot signal is greater than or equal to the signal capacity of the second pilot signal, the precoding feedback information sent to the transmit side by the receive side is a non-acknowledgement indication.

The non-acknowledgement indication is used to indicate that the precoding matrix used for current data transmission is used next time the transmit side transmits data.

Further, when N is greater than 1, the precoding feedback information sent to the transmit side by the receive side is one or more of an index for a first precoding matrix used for the first pilot signal and indexes for second precoding matrices used for the N second pilot signals.

Further, when N is greater than 1 and the N second pilot signals are different, the precoding feedback information is one or more of indexes for the first pilot signal and the N second pilot signals.

Further, in this embodiment of the present invention, data is transmitted between the transmit side and the receive side in a single-stream manner.

Figure 3:
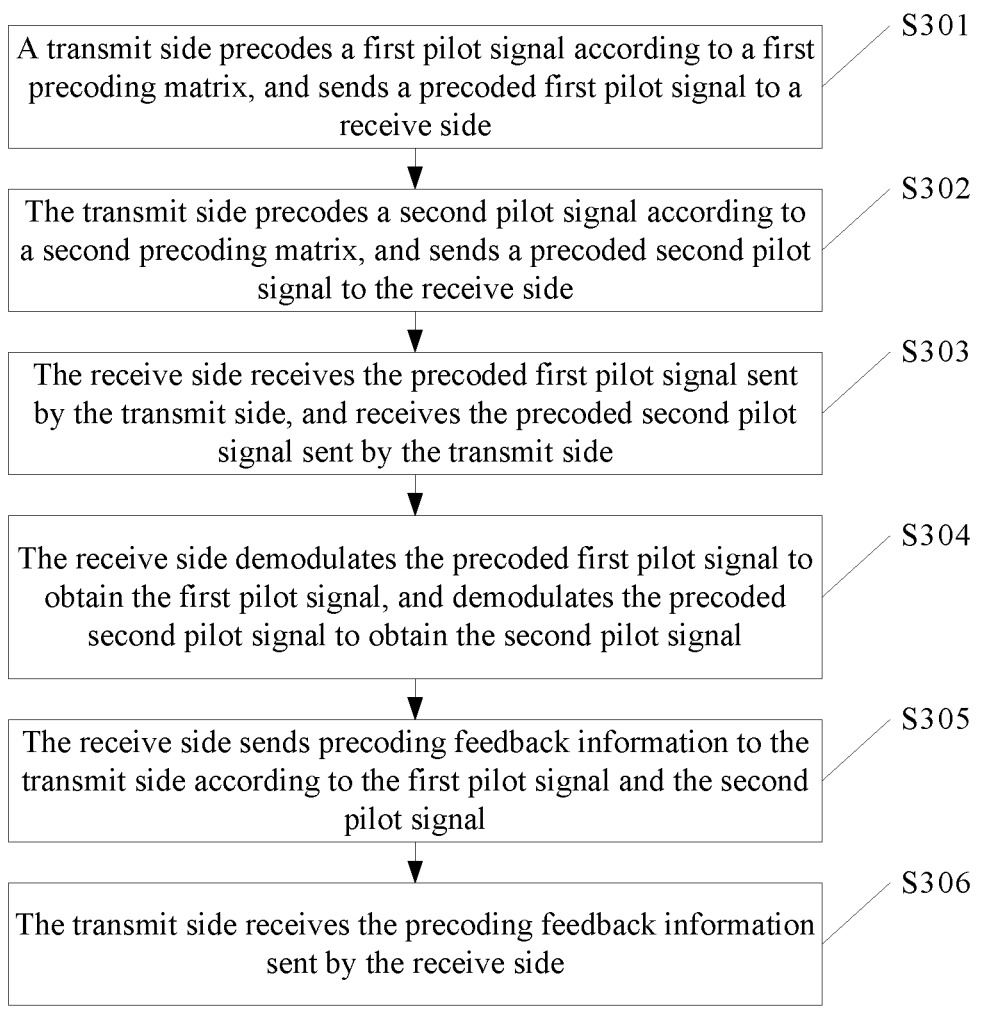
FIG. 3 is a flowchart of a precoding information collection method according to still another embodiment of the present invention.

Another embodiment of the present invention provides a precoding information collection method. A specific implementation process of the method is described in detail using an example in which a quantity of second pilot signals, N, is equal to 1. As shown in FIG. 3, the method may include the following steps.

S301: A transmit side precodes a first pilot signal according to a first precoding matrix, and sends a precoded first pilot signal to a receive side.

The first precoding matrix is the same as a precoding matrix used for current data transmission.

S302: The transmit side precodes a second pilot signal according to a second precoding matrix, and sends a precoded second pilot signal to the receive side.

For example, the second precoding matrix may be obtained according to a precoding matrix for correction and the first precoding matrix. For example, the second precoding matrix is equal to a sum of the precoding matrix for correction and the first precoding matrix. The precoding matrix for correction is generated by the transmit side randomly. A probability that distribution of generated precoding matrices for correction is within a preset range is greater than 0. For example, distribution of the generated precoding matrices for correction may be uniform distribution with a constant feature, may be Gaussian distribution, or may be feature-varying uniform distribution.

It should be noted that the transmit side may send the precoded second pilot signal to the receive side at a time point the same as when the precoded first pilot signal is sent, may send the precoded second pilot signal to the receive side at a time point different from when the precoded first pilot signal is sent, or may send the precoded second pilot signal to the receive side at a frequency different from a frequency at which the precoded first pilot signal is sent.

S303: The receive side receives the precoded first pilot signal sent by the transmit side, and receives the precoded second pilot signal sent by the transmit side.

S304: The receive side demodulates the precoded first pilot signal to obtain the first pilot signal, and demodulates the precoded second pilot signal to obtain the second pilot signal.

S305: The receive side sends precoding feedback information to the transmit side according to the first pilot signal and the second pilot signal.

In a possible implementation, S305 may specifically include S305a1 and S305a2.

S305a1: The receive side obtains signal quality of the first pilot signal, and obtains signal quality of the second pilot signal.

S305a2: The receive side sends the precoding feedback information to the transmit side according to the signal quality of the first pilot signal and the signal quality of the second pilot signal.

In another possible implementation, S305 may specifically include S305b1 and S305b2.

S305b1: The receive side obtains a signal capacity of the first pilot signal, and obtains a signal capacity of the second pilot signal.

S305b2: The receive side sends the precoding feedback information to the transmit side according to the signal capacity of the first pilot signal and the signal capacity of the second pilot signal.

Nevertheless, the receive side may alternatively send the precoding feedback information to the transmit side according to an interference amount of the first pilot signal and an interference amount of the second pilot signal. In this embodiment of the present invention, no limitation is imposed herein on a specific implementation in which the receive side sends the precoding feedback information to the transmit side according to the first pilot signal and the second pilot signal. A corresponding choice may be made as required by an actual application scenario.

The following describes specific content of the precoding feedback information sent to the transmit side by the receive side using an example in which the receive side sends the precoding feedback information to the transmit side according to the signal quality of the first pilot signal and the signal quality of the second pilot signal. After obtaining the signal quality of the first pilot signal and the signal quality of the second pilot signal, the receive side compares the signal quality of the first pilot signal with the signal quality of the second pilot signal. If the receive side determines that the signal quality of the first pilot signal is inferior or equal to the signal quality of the second pilot signal, the precoding feedback information sent to the transmit side by the receive side is an acknowledgement indication. If the receive side determines that the signal quality of the first pilot signal is superior or equal to the signal quality of the second pilot signal, the precoding feedback information sent to the transmit side by the receive side is a non-acknowledgement indication.

The acknowledgement indication is used to indicate that the precoding matrix used for current data transmission is not used next time the transmit side transmits data. It may also be understood that the acknowledgement indication is used to indicate that the transmit side needs to update the precoding matrix used for current data transmission. The non-acknowledgement indication is used to indicate that the precoding matrix used for current data transmission is used next time the transmit side transmits data. For example, there is one bit included in the precoding feedback information sent to the transmit side by the receive side. For example, 0 represents a non-acknowledgement indication, and 1 represents an acknowledgement indication.

It should be noted that for a process of sending the precoding feedback information to the transmit side by the receive side according to the signal capacity of the first pilot signal and the signal capacity of the second pilot signal, reference may be made to the process of sending the precoding feedback information to the transmit side by the receive side according to the signal quality of the first pilot signal and the signal quality of the second pilot signal. No further details are described herein.

S306: The transmit side receives the precoding feedback information sent by the receive side.

The precoding feedback information received by the transmit side may be an acknowledgement indication, or may be a non-acknowledgement indication. For example, when the precoding feedback information received by the transmit side is 1, the transmit side can learn, according to the received precoding feedback information, that the receive side recommends that the precoding matrix used for current data transmission not be used for next data transmission. That is, the transmit side can learn, according to the precoding feedback information, that the transmit side needs to update the precoding matrix used for current data transmission.

After the transmit side receives the precoding feedback information sent by the receive side, the transmit side can determine, according to the received precoding feedback information, a precoding matrix used for next data transmission. For example, when the precoding feedback information received by the transmit side is an acknowledgement indication, the transmit side determines that the precoding matrix used for next data transmission is the second precoding matrix; when the precoding feedback information received by the transmit side is a non-acknowledgement indication, the transmit side determines that the precoding matrix used for next data transmission is the first precoding matrix.

In actual application, in addition to receiving the precoding feedback information sent by the receive side, the transmit side may further receive precoding feedback information sent by multiple other receive sides, and determine, by comprehensively considering the received multiple pieces of precoding feedback information, one precoding matrix that causes the slightest interference to the other receive sides, as a precoding matrix used for next data transmission with the receive side. For example, the precoding matrix used for next data transmission that is determined by the transmit side by comprehensively considering the received multiple pieces of precoding feedback information is the second precoding matrix.

After the transmit side determines the precoding matrix used for next data transmission, the transmit side can transmit data according to the determined precoding matrix. Simultaneously, to ensure that the receive side can correctly demodulate the data transmitted by the transmit side, the transmit side also needs to send a pilot signal used to demodulate the transmitted data. Therefore, in a possible implementation, the transmit side precodes a third pilot signal according to a third precoding matrix and sends a precoded third pilot signal to the receive side. In another possible implementation, because a radio channel environment changes in real time, the transmit side also needs to determine whether an error in a precoding matrix determined by the transmit side at a next time point is the smallest. That is, the transmit side also needs to determine whether the precoding matrix determined by the transmit side at the next time point best matches an actual data transmission channel. In other words, the transmit side precodes a fourth pilot signal according to a fourth precoding matrix and sends a precoded fourth pilot signal to the receive side.

The third precoding matrix is a precoding matrix determined by the transmit side according to the precoding feedback information from the receive side, and the fourth precoding matrix is different from the third precoding matrix. For example, the fourth precoding matrix may be obtained according to a precoding matrix for correction and the third precoding matrix. For example, the fourth precoding matrix is equal to a sum of the precoding matrix for correction and the third precoding matrix.

It should be noted that the transmit side may send the precoded fourth pilot signal to the receive side at a time point the same as when the precoded third pilot signal is sent, may send the precoded fourth pilot signal to the receive side at a time point different from when the precoded third pilot signal is sent, or may send the precoded fourth pilot signal to the receive side at a frequency different from a frequency at which the precoded third pilot signal is sent.

According to the precoding information collection method provided by this embodiment of the present invention, a transmit side sends, to a receive side, a first pilot signal precoded by using a first precoding matrix and N second pilot signals precoded by using N second precoding matrices, and receives precoding feedback information sent by the receive side. This enables the transmit side to adaptively adjust a precoding matrix used for data transmission, according to the precoding feedback information that is sent by the receive side and used to recommend a precoding matrix for the transmit side to transmit data, and further makes the precoding matrix used for data transmission match an actual data transmission channel. In this way, performance of a wireless communications system is improved.

In addition, the transmit side constantly adjusts, according to the received precoding feedback information, a precoding matrix used for next data transmission. This can gradually reduce an error in the precoding matrix used for next data transmission and further improve performance of the wireless communications system.

Figure 4:
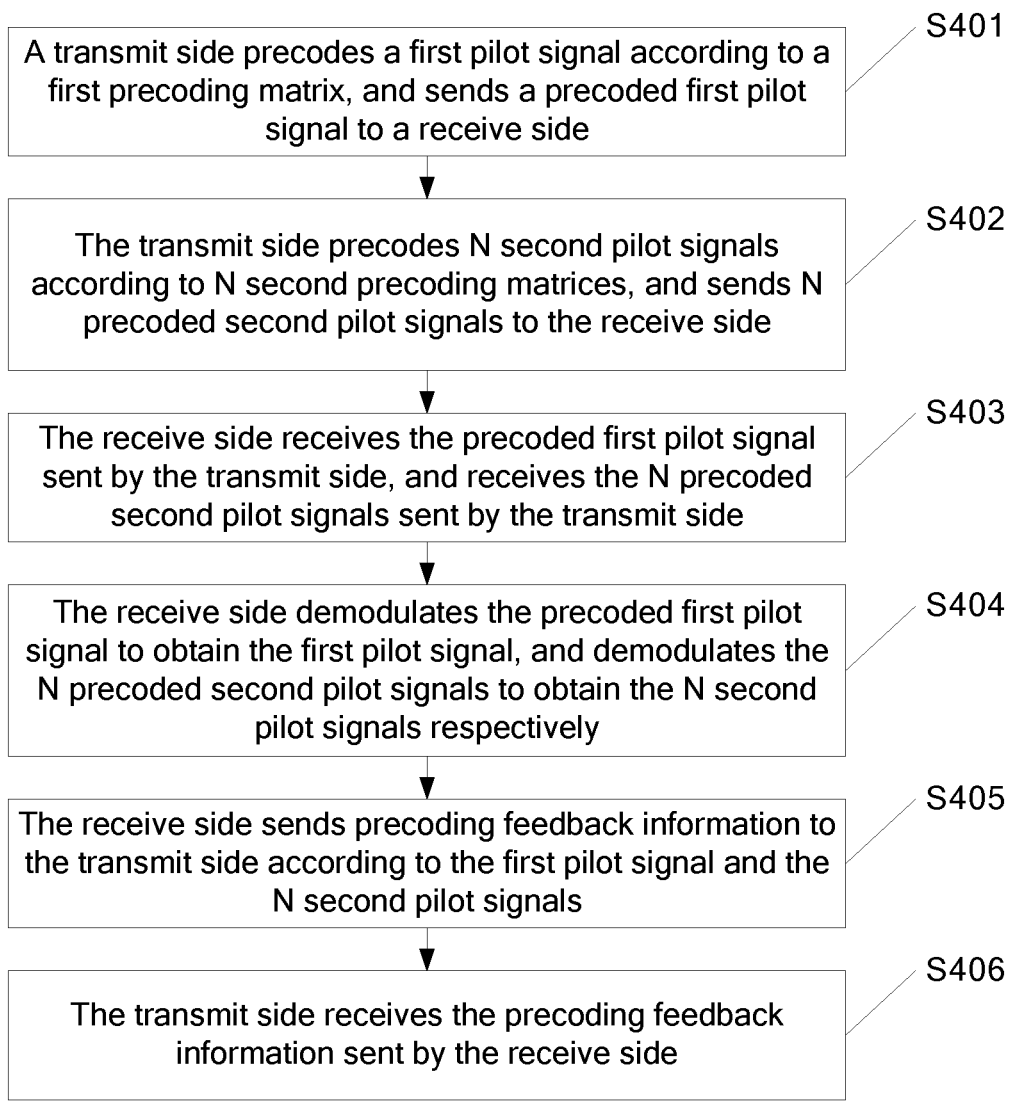
FIG. 4 is a flowchart of a precoding information collection method according to another embodiment of the present invention.

Another embodiment of the present invention provides a precoding information collection method shown in FIG. 4. In a first application scenario, a specific implementation process of the precoding information collection method provided by this embodiment of the present invention is described in detail using an example in which a quantity of second pilot signals, N, is greater than 1, and precoding feedback information is an acknowledgement indication and one or more of indexes for N second precoding matrices, or precoding feedback information is a non-acknowledgement indication. In this application scenario, the method may include the following steps.

S401: A transmit side precodes a first pilot signal according to a first precoding matrix, and sends a precoded first pilot signal to a receive side.

The first precoding matrix is the same as a precoding matrix used for current data transmission.

S402: The transmit side precodes N second pilot signals according to N second precoding matrices, and sends N precoded second pilot signals to the receive side.

N is an integer greater than 1, the second precoding matrices used for precoding the second pilot signals are different from each other, and the N second precoding matrices are different from the first precoding matrix. The N second pilot signals may be the same, or may be different. Specifically, the transmit side precodes the $1^{st}$ second pilot signal according to the $1^{st}$ second precoding matrix and sends the $1^{st}$ precoded second pilot signal to the receive side; the transmit side precodes the $2^{nd}$ second pilot signal according to the $2^{nd}$ second precoding matrix and sends the $2^{nd}$ precoded second pilot signal to the receive side; by analogy, the transmit side precodes the $N^{th}$ second pilot signal according to the $N^{th}$ second precoding matrix, and sends the $N^{th}$ precoded second pilot signal to the receive side. For example, different second precoding matrices may be obtained according to different precoding matrices for correction and the first precoding matrix. For example, the $1^{st}$ second precoding matrix is equal to a sum of the $1^{st}$ precoding matrix for correction and the first precoding matrix, the $2^{nd}$ second precoding matrix is equal to a sum of the $2^{nd}$ precoding matrix for correction and the first precoding matrix, and by analogy, the $N^{th}$ second precoding matrix is equal to a sum of the $N^{th}$ precoding matrix for correction and the first precoding matrix. The N precoding matrices for correction are generated by the transmit side randomly, and a probability that distribution of the N precoding matrices for correction is within a preset range is greater than 0. For example, distribution of the N precoding matrices for correction may be uniform distribution with a constant feature, may be Gaussian distribution, or may be feature-varying uniform distribution.

It should be noted that the transmit side may send the N precoded second pilot signals to the receive side at a time point the same as when the precoded first pilot signal is sent, may send the N precoded second pilot signals to the receive side at a time point different from when the precoded first pilot signal is sent, or may send the N precoded second pilot signals to the receive side at a frequency different from a frequency at which the precoded first pilot signal is sent.

S403: The receive side receives the precoded first pilot signal sent by the transmit side, and receives the N precoded second pilot signals sent by the transmit side.

S404: The receive side demodulates the precoded first pilot signal to obtain the first pilot signal, and demodulates the N precoded second pilot signals to obtain the N second pilot signals respectively.

S405: The receive side sends precoding feedback information to the transmit side according to the first pilot signal and the N second pilot signals.

In a possible implementation, S405 may specifically include S405a1 and S405a2.

S405a1: The receive side obtains signal quality of the first pilot signal and obtains signal quality of each of the N second pilot signals.

S405a2: The receive side sends the precoding feedback information to the transmit side according to the signal quality of the first pilot signal and the signal quality of each of the N second pilot signals.

In another possible implementation, S405 may specifically include S405b1 and S405b2.

S405b1: The receive side obtains a signal capacity of the first pilot signal and obtains a signal capacity of each of the N second pilot signals.

S405b2: The receive side sends the precoding feedback information to the transmit side according to the signal capacity of the first pilot signal and the signal capacity of each of the N second pilot signals.

Nevertheless, the receive side may alternatively send the precoding feedback information to the transmit side according to an interference amount of the first pilot signal and interference amounts of the N second pilot signals. In this embodiment of the present invention, no limitation is imposed herein on a specific implementation in which the receive side sends the precoding feedback information to the transmit side according to the first pilot signal and the N second pilot signals. A corresponding choice may be made as required by an actual application scenario.

The following describes specific content of the precoding feedback information sent to the transmit side by the receive side using an example in which the receive side sends the precoding feedback information to the transmit side according to the signal quality of the first pilot signal and the signal quality of each of the N second pilot signals.

After obtaining the signal quality of the first pilot signal and the signal quality of each of the N second pilot signals, the receive side compares the signal quality of the first pilot signal with the signal quality of each of the N second pilot signals. If the receive side determines that, among the N second pilot signals, there is one or more second pilot signals having signal quality superior to the signal quality of the first pilot signal, the precoding feedback information sent to the transmit side by the receive side is an acknowledgement indication and an index or indexes for a second precoding matrix or second precoding matrices used for the one or more second pilot signals. If the receive side determines that signal quality of the first pilot signal is superior or equal to the signal quality of the second pilot signal, the precoding feedback information sent to the transmit side by the receive side is a non-acknowledgement indication.

The acknowledgement indication is used to indicate that the precoding matrix used for current data transmission is not used next time the transmit side transmits data. It may also be understood that the acknowledgement indication is used to indicate that the transmit side needs to update the precoding matrix used for current data transmission. The non-acknowledgement indication is used to indicate that the precoding matrix used for current data transmission is used next time the transmit side transmits data. For example, 0 represents a non-acknowledgement indication, and 1 represents an acknowledgement indication. When N is equal to 7, it may be defined that an index for the first precoding matrix used for precoding the first pilot signal is 000, and that indexes for second precoding matrices used for precoding the N second pilot signals (from the $1^{st}$ second pilot signal to the $7^{th}$ second pilot signal) are respectively 001, 010, 011, 100, 101, 110, and 111. If the receive side determines that signal quality of the $1^{st}$ of the seven second pilot signals and signal quality of the $7^{th}$ of the seven second pilot signals are both superior to the signal quality of the first pilot signal, the precoding feedback information sent to the transmit side by the receive side is 1, 001, and 111. If the receive side determines that the signal quality of the first pilot signal is superior to that of each of the seven second pilot signals, the precoding feedback information sent to the transmit side is 0.

It should be noted that for a process of sending the precoding feedback information to the transmit side by the receive side according to the signal capacity of the first pilot signal and the signal capacities of the N second pilot signals, reference may be made to the process of sending the precoding feedback information to the transmit side by the receive side according to the signal quality of the first pilot signal and the signal quality of the N second pilot signals. No further details are described herein.

S406: The transmit side receives the precoding feedback information sent by the receive side.

The precoding feedback information may be an acknowledgement indication and one or more of indexes for N second precoding matrices, or may be a non-acknowledgement indication. For example, when the precoding feedback information received by the transmit side is 1, 001, and 111, according to the received precoding feedback information, the transmit side can not only learn that the receive side recommends that the precoding matrix used for current data transmission not be used for next data transmission, but also learn that a precoding matrix used for next data transmission that is recommended by the receive side is a second precoding matrix whose index is 001 and 111. That is, the transmit side can learn, according to the received precoding feedback information, that the precoding matrix used for current data transmission needs to be updated.

After the transmit side receives the precoding feedback information sent by the receive side, the transmit side can determine, according to the received precoding feedback information, a precoding matrix used for next data transmission. For example, when the precoding feedback information received by the transmit side is an acknowledgement indication and one or more of indexes for the N second precoding matrices, the transmit side determines that the precoding matrix used for next data transmission is a second precoding matrix corresponding to an index; when the precoding feedback information received by the transmit side is a non-acknowledgement indication, the transmit side determines that the precoding matrix used for next data transmission is the first precoding matrix.

In actual application, in addition to receiving the precoding feedback information sent by the receive side, the transmit side may further receive precoding feedback information sent by multiple other receive sides, and determine, by comprehensively considering the received multiple pieces of precoding feedback information, one precoding matrix that causes the slightest interference to the other receive sides, as a precoding matrix used for next data transmission with the receive side. For example, the precoding matrix used for next data transmission that is determined by the transmit side by comprehensively considering the received multiple pieces of precoding feedback information is a second precoding matrix corresponding to 001.

After the transmit side determines the precoding matrix used for next data transmission, the transmit side can transmit data according to the determined precoding matrix. Simultaneously, to ensure that the receive side can correctly demodulate the data transmitted by the transmit side, the transmit side also needs to send a pilot signal used to demodulate the transmitted data. Therefore, in a possible implementation, the transmit side precodes a third pilot signal according to a third precoding matrix and sends a precoded third pilot signal to the receive side. In another possible implementation, because a radio channel environment changes in real time, the transmit side also needs to determine whether an error in a precoding matrix determined by the transmit side at a next time point is the smallest. That is, the transmit side also needs to determine whether the precoding matrix determined by the transmit side at the next time point best matches an actual data transmission channel. In other words, the transmit side precodes N fourth pilot signals according to N fourth precoding matrices and sends N precoded fourth pilot signals to the receive side.

The third precoding matrix is a precoding matrix determined by the transmit side according to the precoding feedback information from the receive side, fourth precoding matrices used for precoding the fourth pilot signals are different from each other, and the N fourth precoding matrices are different from the third precoding matrix.

It should be noted that the transmit side may send the N precoded fourth pilot signals to the receive side at a time point the same as when the precoded third pilot signal is sent, may send the N precoded fourth pilot signals to the receive side at a time point different from when the precoded third pilot signal is sent, or may send the N precoded fourth pilot signals to the receive side at a frequency different from a frequency at which the precoded third pilot signal is sent.

In a second application scenario, a specific implementation process of the precoding information collection method shown in FIG. 4 according to this embodiment of the present invention is described in detail using an example in which a quantity of second pilot signals, N, is greater than 1, N second pilot signals are different, and precoding feedback information is an acknowledgement indication and one or more of indexes for the N second pilot signals, or precoding feedback information is a non-acknowledgement indication. In this application scenario, the method may include the following steps.

S501: A transmit side precodes a first pilot signal according to a first precoding matrix, and sends a precoded first pilot signal to a receive side.

The first precoding matrix is the same as a precoding matrix used for current data transmission.

S502: The transmit side precodes N second pilot signals according to N second precoding matrices, and sends N precoded second pilot signals to the receive side.

N is an integer greater than 1, the second precoding matrices used for precoding the second pilot signals are different from each other, and the N second precoding matrices are different from the first precoding matrix.

S503: The receive side receives the precoded first pilot signal sent by the transmit side, and receives the N precoded second pilot signals sent by the transmit side.

S504: The receive side demodulates the precoded first pilot signal to obtain the first pilot signal, and demodulates the N precoded second pilot signals to obtain the N second pilot signals respectively.

S505: The receive side sends precoding feedback information to the transmit side according to the first pilot signal and the N second pilot signals.

In a possible implementation, S505 may specifically include S505a1 and S505a2.

S505a1: The receive side obtains signal quality of the first pilot signal and obtains signal quality of each of the N second pilot signals.

S505a2: The receive side sends the precoding feedback information to the transmit side according to the signal quality of the first pilot signal and the signal quality of each of the N second pilot signals.

In another possible implementation, S505 may specifically include S505b1 and S505b2.

S505b1: The receive side obtains a signal capacity of the first pilot signal and obtains a signal capacity of each of the N second pilot signals.

S505b2: The receive side sends the precoding feedback information to the transmit side according to the signal capacity of the first pilot signal and the signal capacity of each of the N second pilot signals.

Nevertheless, the receive side may alternatively send the precoding feedback information to the transmit side according to an interference amount of the first pilot signal and interference amounts of the N second pilot signals. In this embodiment of the present invention, no limitation is imposed herein on a specific implementation in which the receive side sends the precoding feedback information to the transmit side according to the first pilot signal and the N second pilot signals. A corresponding choice may be made as required by an actual application scenario.

The following describes specific content of the precoding feedback information sent to the transmit side by the receive side using an example in which the receive side sends the precoding feedback information to the transmit side according to the signal quality of the first pilot signal and the signal quality of each of the N second pilot signals. After obtaining the signal quality of the first pilot signal and the signal quality of each of the N second pilot signals, the receive side compares the signal quality of the first pilot signal with the signal quality of each of the N second pilot signals. If the receive side determines that, among the N second pilot signals, there is one or more second pilot signals having signal quality superior to the signal quality of the first pilot signal, the precoding feedback information sent to the transmit side by the receive side is an acknowledgement indication and an index or indexes for the one or more second pilot signals. If the receive side determines that signal quality of the first pilot signal is superior or equal to the signal quality of the second pilot signal, the precoding feedback information sent to the transmit side by the receive side is a non-acknowledgement indication.

The acknowledgement indication is used to indicate that the precoding matrix used for current data transmission is not used next time the transmit side transmits data. It may also be understood that the acknowledgement indication is used to indicate that the transmit side needs to update the precoding matrix used for current data transmission. The non-acknowledgement indication is used to indicate that the precoding matrix used for current data transmission is used next time the transmit side transmits data. For example, 0 represents a non-acknowledgement indication, and 1 represents an acknowledgement indication. When N is equal to 7, it may be defined that an index for the first pilot signal is 0'0'0', and that indexes for the N second pilot signals (from the $1^{st}$ second pilot signal to the $7^{th}$ second pilot signal) are respectively 0'0'1', 0'1'0', 0'1'1', 1'0'0', 1'0'1', 1'1'0', and 1'1'1'. If the receive side determines that signal quality of the $1^{st}$ of the seven second pilot signals and signal quality of the $7^{th}$ of the seven second pilot signals are both superior to the signal quality of the first pilot signal, the precoding feedback information sent to the transmit side by the receive side is 1, 0'0'1', and 1'1'1' If the receive side determines that the signal quality of the first pilot signal is superior to that of each of the seven second pilot signals, the precoding feedback information sent to the transmit side is 0.

It should be noted that for a process of sending the precoding feedback information to the transmit side by the receive side according to the signal capacity of the first pilot signal and the signal capacities of the N second pilot signals, reference may be made to the process of sending the precoding feedback information to the transmit side by the receive side according to the signal quality of the first pilot signal and the signal quality of the N second pilot signals. No further details are described herein.

S506: The transmit side receives the precoding feedback information sent by the receive side.

The precoding feedback information may be an acknowledgement indication and one or more of indexes for the N second pilot signals, or may be a non-acknowledgement indication. For example, when the precoding feedback information received by the transmit side is 1, 0'0'1', and 1'1'1', according to the received precoding feedback information, the transmit side can not only learn that the receive side recommends that the precoding matrix used for current data transmission not be used for next data transmission, but also learn that precoding matrices used for next data transmission that are recommended by the receive side are second precoding matrices used for second pilot signals whose indexes are 0'0'1' and 1'1'1'. That is, the transmit side can learn, according to the received precoding feedback information, that the precoding matrix used for current data transmission needs to be updated.

After the transmit side receives the precoding feedback information sent by the receive side, the transmit side can determine, according to the received precoding feedback information, a precoding matrix used for next data transmission. For example, when the precoding feedback information received by the transmit side is an acknowledgement indication and one or more of indexes for the N second precoding matrices, the transmit side determines that the precoding matrix used for next data transmission is a second precoding matrix used for a second pilot signal corresponding to an index; when the precoding feedback information received by the transmit side is a non-acknowledgement indication, the transmit side determines that the precoding matrix used for next data transmission is the first precoding matrix.

In actual application, in addition to receiving the precoding feedback information sent by the receive side, the transmit side may further receive precoding feedback information sent by multiple other receive sides, and determine, by comprehensively considering the received multiple pieces of precoding feedback information, one precoding matrix that causes the slightest interference to the other receive sides, as a precoding matrix used for next data transmission with the receive side. For example, the precoding matrix used for next data transmission that is determined by the transmit side by comprehensively considering the received multiple pieces of precoding feedback information is a second precoding matrix used for a second pilot signal whose index is 0'0'1'.

It should be noted that for descriptions in S501 to S506 in this embodiment of the present invention, reference may be made to descriptions in S401 to S406 in the foregoing embodiment of the present invention. No further details are described herein in this embodiment of the present invention.

In a fourth application scenario, a specific implementation process of the precoding information collection method shown in FIG. 4 according to an embodiment of the present invention is described in detail using an example in which a quantity of second pilot signals, N, is greater than 1, and precoding feedback information is one or more of indexes for a first precoding matrix and N second precoding matrices, or precoding feedback information is one or more of indexes for a first pilot signal and N second pilot signals. In this application scenario, the method may include the following steps.

S601: A transmit side precodes a first pilot signal according to a first precoding matrix, and sends a precoded first pilot signal to a receive side.

The first precoding matrix is the same as a precoding matrix used for current data transmission.

S602: The transmit side precodes N second pilot signals according to N second precoding matrices, and sends N precoded second pilot signals to the receive side.

N is an integer greater than 1, the second precoding matrices used for precoding the second pilot signals are different from each other, and the N second precoding matrices are different from the first precoding matrix.

S603: The receive side receives the precoded first pilot signal sent by the transmit side, and receives the N precoded second pilot signals sent by the transmit side.

S604: The receive side demodulates the precoded first pilot signal to obtain the first pilot signal, and demodulates the N precoded second pilot signals to obtain the N second pilot signals respectively.

S605: The receive side sends precoding feedback information to the transmit side according to the first pilot signal and the N second pilot signals.

In a possible implementation, S605 may specifically include S605a1 and S605a2.

S605a1: The receive side obtains signal quality of the first pilot signal and obtains signal quality of each of the N second pilot signals.

S605a2: The receive side sends the precoding feedback information to the transmit side according to the signal quality of the first pilot signal and the signal quality of each of the N second pilot signals.

In another possible implementation, S605 may specifically include S605b1 and S605b2.

S605b1: The receive side obtains a signal capacity of the first pilot signal and obtains a signal capacity of each of the N second pilot signals.

S605b2: The receive side sends the precoding feedback information to the transmit side according to the signal capacity of the first pilot signal and the signal capacity of each of the N second pilot signals.

Nevertheless, the receive side may alternatively send the precoding feedback information to the transmit side according to an interference amount of the first pilot signal and interference amounts of the N second pilot signals. In this embodiment of the present invention, no limitation is imposed herein on a specific implementation in which the receive side sends the precoding feedback information to the transmit side according to the first pilot signal and the N second pilot signals. A corresponding choice may be made as required by an actual application scenario.

The following describes specific content of the precoding feedback information sent to the transmit side by the receive side using an example in which the receive side sends the precoding feedback information to the transmit side according to the signal quality of the first pilot signal and the signal quality of each of the N second pilot signals.

After obtaining the signal quality of the first pilot signal and the signal quality of each of the N second pilot signals, in a possible implementation, the precoding feedback information sent to the transmit side by the receive side according to the obtained signal quality of the first pilot signal and the obtained signal quality of each of the N second pilot signals is one or more of an index for the first precoding matrix used for the first pilot signal and indexes for the second precoding matrix used for the N second pilot signals.

All pilot signals may be the same, or may be different. For example, an index for a precoding matrix used for a pilot signal defined in S405 is still used as an example. If a selection policy of the receive side is to select two pilot signals that have better signal quality, and the two pilot signals having better signal quality that are selected by the receive side are the first pilot signal and the $1^{st}$ second pilot signal, precoding feedback information sent to the transmit side by the receive side is 000 and 001.

After obtaining the signal quality of the first pilot signal and the signal quality of each of the N second pilot signals, in another possible implementation, when all pilot signals are different (the first pilot signal is different from the N second pilot signals, and the N second pilot signals are different), the precoding feedback information sent to the transmit side by the receive side according to the obtained signal quality of the first pilot signal and the obtained signal quality of each of the N second pilot signals is one or more of indexes for the first pilot signal and the N second pilot signals.

For example, an index for a pilot signal defined in S505 is still used as example. If a selection policy of the receive side is to select two pilot signals that have better signal quality, and the two pilot signals having better signal quality that are selected by the receive side are the first pilot signal and the $1^{st}$ second pilot signal, precoding feedback information sent to the transmit side by the receive side is 0'0'0' and 0'0'1'.

It should be noted that for a process of sending the precoding feedback information to the transmit side by the receive side according to the signal capacity of the first pilot signal and the signal capacities of the N second pilot signals, reference may be made to the process of sending the precoding feedback information to the transmit side by the receive side according to the signal quality of the first pilot signal and the signal quality of the N second pilot signals. No further details are described herein.

S606: The transmit side receives the precoding feedback information sent by the receive side.

In a possible implementation, the precoding feedback information received by the transmit side one or more of indexes for the first precoding matrix and the N second precoding matrices.

For example, when the precoding feedback information received by the transmit side is 000 and 001, according to the precoding feedback information, the transmit side can not only learn that the receive side recommends that the precoding matrix used for current data transmission not be used for next data transmission, but also learn that precoding matrices used for next data transmission that are recommended by the receive side are precoding matrices whose indexes are 000 and 001. It may also be understood that the transmit side can learn, according to the received precoding feedback information, that the precoding matrix used for current data transmission needs to be updated. In a process of updating, by the transmit side, the precoding matrix used for current data transmission, received precoding feedback information sent by multiple receive sides may be comprehensively considered to select one precoding matrix that causes the slightest interference to other receive sides. For example, the transmit side updates the precoding matrix used for next data transmission to a second precoding matrix whose index is 001 by comprehensively considering the received multiple pieces of precoding feedback information.

In another possible implementation, the precoding feedback information received by the transmit side is one or more of indexes for the first pilot signal and the N second pilot signals.

For example, when the precoding feedback information received by the transmit side is 0'0'1' and 1'1'1', according to the precoding feedback information, the transmit side can not only learn that the receive side recommends that the precoding matrix used for current data transmission not be used for next data transmission, but also learn that precoding matrices used for next data transmission that are recommended by the receive side are precoding matrices used for pilot signals whose indexes are 0'0'1' and 1'1'1'. It may also be understood that the transmit side can learn, according to the received precoding feedback information, that the precoding matrix used for current data transmission needs to be updated.

After the transmit side receives the precoding feedback information sent by the receive side, the transmit side can determine, according to the received precoding feedback information, a precoding matrix used for next data transmission. For example, when the precoding feedback information received by the transmit side is one or more of indexes for the first precoding matrix and the N second precoding matrices, the transmit side determines that a precoding matrix used for next data transmission is a precoding matrix corresponding to an index; when the precoding feedback information received by the transmit side is one or more of indexes for the first pilot signal and the N second pilot signals, the transmit side determines that a precoding matrix used for next data transmission is a precoding matrix used for a pilot signal corresponding to an index.

In actual application, in addition to receiving the precoding feedback information sent by the receive side, the transmit side may further receive precoding feedback information sent by multiple other receive sides, and determine, by comprehensively considering the received multiple pieces of precoding feedback information, one precoding matrix that causes the slightest interference to the other receive sides, as a precoding matrix used for next data transmission with the receive side. For example, the precoding matrix used for next data transmission that is determined by the transmit side by comprehensively considering the received multiple pieces of precoding feedback information is a second precoding matrix used for a second pilot signal whose index is 0'0'1'.

It should be noted that for descriptions in S601 to S606 in this embodiment of the present invention, reference may be made to descriptions in S401 to S406 in the foregoing embodiment of the present invention. No further details are described herein in this embodiment of the present invention.

According to the precoding information collection method provided by this embodiment of the present invention, a transmit side sends, to a receive side, a first pilot signal precoded by using a first precoding matrix and N second pilot signals precoded by using N second precoding matrices, and receives precoding feedback information sent by the receive side. This enables the transmit side to adaptively adjust a precoding matrix used for data transmission, according to the precoding feedback information that is sent by the receive side and used to recommend a precoding matrix for the transmit side to transmit data, and further makes the precoding matrix used for data transmission match an actual data transmission channel. In this way, performance of a wireless communications system is improved.

In addition, the transmit side constantly adjusts, according to the received precoding feedback information, a precoding matrix used for next data transmission. This can gradually reduce an error in the precoding matrix used for next data transmission and further improve performance of the wireless communications system.

Figure 5:
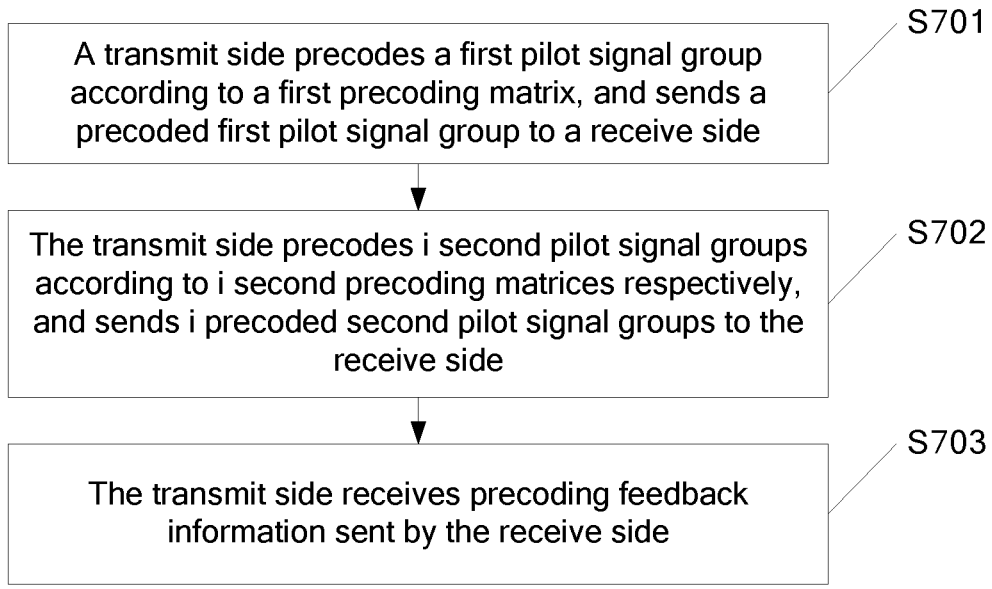
FIG. 5 is a flowchart of a precoding information collection method according to another embodiment of the present invention.

Another embodiment of the present invention provides a precoding information collection method that is applied to a transmit side. There are M data streams used for data transmission between the transmit side and at least one receive side, and M is an integer greater than 1. As shown in FIG. 5, the method may include:

S701: The transmit side precodes a first pilot signal group according to a first precoding matrix, and sends a precoded first pilot signal group to the receive side.

The first precoding matrix includes M first precoding vectors that are different from each other, the first pilot signal group includes M first pilot signals, and the first precoding matrix is the same as a precoding matrix used for current data transmission.

S702: The transmit side precodes i second pilot signal groups according to i second precoding matrices respectively, and sends i precoded second pilot signal groups to the receive side.

The $i^{th}$ second precoding matrix includes $A_i$ second precoding vectors that are different from each other, the $i^{th}$ second pilot signal group includes $A_i$ second pilot signals, i is an integer greater than or equal to 1, $A_i$ is an integer greater than or equal to 1, the second precoding matrices used for precoding the second pilot signal groups are different from each other, and the i second precoding matrices are different from the first precoding matrix.

S703: The transmit side receives the precoding feedback information sent by the receive side.

The precoding feedback information may be understood as information related to a precoding matrix that the receive side recommends the transmit side to use for next data transmission.

Further, when i in S702 is equal to 1, in S703, the precoding feedback information that is sent by the receive side and received by the transmit side is an acknowledgement indication.

The acknowledgement indication is used to indicate that the precoding matrix used for current data transmission is not used for next data transmission.

Further, when i in S702 is greater than 1, in S703, the precoding feedback information that is sent by the receive side and received by the transmit side is an acknowledgement indication and one or more of indexes for the i second precoding matrices.

The acknowledgement indication is used to indicate that the precoding matrix used for current data transmission is not used for next data transmission.

Further, when i in S702 is greater than 1 and the i second pilot signal groups are different, in S703, the precoding feedback information that is sent by the receive side and received by the transmit side is an acknowledgement indication and one or more of indexes for the i second pilot signal groups.

The acknowledgement indication is used to indicate that the precoding matrix used for current data transmission is not used for next data transmission.

Further, in S703, the precoding feedback information that is sent by the receive side and received by the transmit side is a non-acknowledgement indication.

The non-acknowledgement indication is used to indicate that the precoding matrix used for current data transmission is used for next data transmission.

Further, when i in S702 is greater than 1, in S703, the precoding feedback information that is sent by the receive side and received by the transmit side is one or more of indexes for the first precoding matrix and the i second precoding matrices.

Further, when i in S702 is greater than 1 and the i second pilot signal groups are different, in S703, the precoding feedback information that is sent by the receive side and received by the transmit side is one or more of indexes for the first pilot signal group and the i second pilot signal groups.

Further, in S703, the precoding feedback information that is sent by the receive side and received by the transmit side is indexes for B precoding vectors of precoding vectors used for the M first pilot signals and precoding vectors used for $$\sum_i A_i$$

second pilot signals.

B is an integer that is greater than or equal to 1 and less than or equal to $$\sum_i A_i + M.$$

Further, in S703, the precoding feedback information that is sent by the receive side and received by the transmit side is indexes for B pilot signals of the M first pilot signals and $$\sum_i A_i$$

second pilot signals.

B is an integer that is greater than or equal to 1 and less than or equal to $$\sum_i A_i + M.$$

According to the precoding information collection method provided by this embodiment of the present invention, a transmit side sends, to a receive side, a first pilot signal group precoded by using a first precoding matrix and i second pilot signal groups precoded by using i second precoding matrices, and receives precoding feedback information sent by the receive side. This enables the transmit side to adaptively adjust a precoding matrix used for data transmission, according to the precoding feedback information that is sent by the receive side and used to recommend a precoding matrix for the transmit side to transmit data, and further makes the precoding matrix used for data transmission match an actual data transmission channel. In this way, performance of a wireless communications system is improved.

Figure 6:
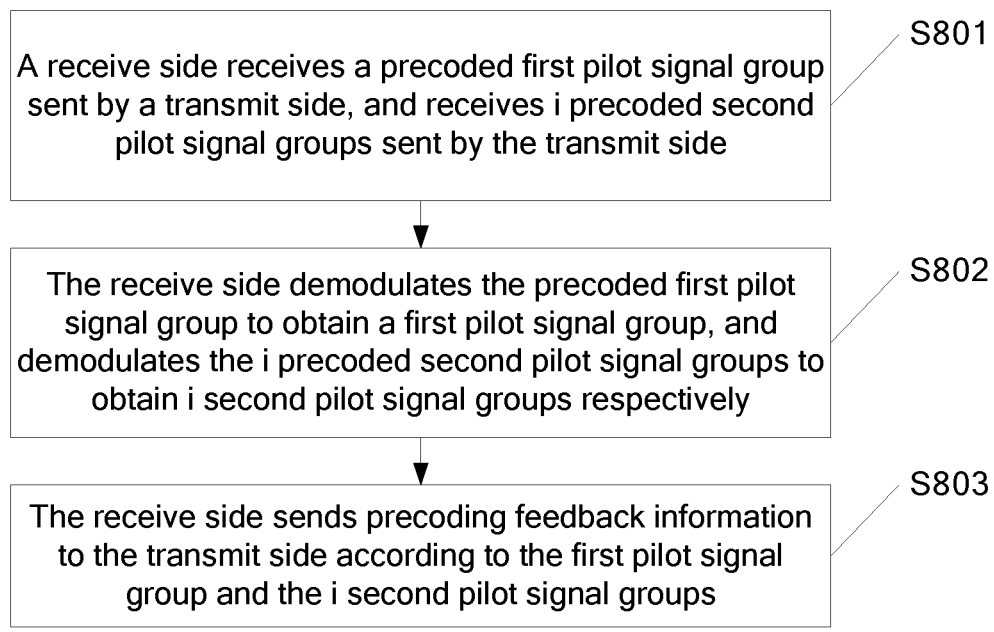
FIG. 6 is a flowchart of a precoding information collection method according to another embodiment of the present invention.

Another embodiment of the present invention provides a precoding information collection method that is applied to a receive side. There are M data streams used for data transmission between the receive side and a transmit side, and M is an integer greater than 1. As shown in FIG. 6, the method may include the following steps.

S801: The receive side receives a precoded first pilot signal group sent by the transmit side, and receives i precoded second pilot signal groups sent by the transmit side.

Herein, i is an integer greater than or equal to 1.

S802: The receive side demodulates the precoded first pilot signal group to obtain a first pilot signal group, and demodulates the i precoded second pilot signal groups to obtain i second pilot signal groups respectively.

S803: The receive side sends precoding feedback information to the transmit side according to the first pilot signal group and the i second pilot signal groups.

After the receive side receives the precoded first pilot signal group and the i precoded second pilot signal groups that are sent by the sending end, the receive side demodulates the precoded first pilot signal group to obtain a first pilot signal group, and demodulates the i precoded second pilot signal groups to obtain i second pilot signal groups respectively, and further sends precoding feedback information to the transmit side according to the first pilot signal group and the i second pilot signal groups that are obtained.

According to the precoding information collection method provided by this embodiment of the present invention, after receiving a precoded first pilot signal group and i precoded second pilot signal groups that are sent by a transmit side, a receive side demodulates the precoded first pilot signal group to obtain a first pilot signal group, and demodulates the i precoded second pilot signal groups to obtain i second pilot signal groups respectively; and sends, to the transmit side according to the first pilot signal group and the i second pilot signal groups that are obtained, precoding feedback information used to recommend a precoding matrix for the transmit side to transmit data. This enables the transmit side to adaptively adjust, according to the precoding feedback information sent by the receive side, a precoding matrix used for data transmission, and further makes the precoding matrix used for data transmission match an actual data transmission channel. In this way, performance of a wireless communications system is improved.

Further, in a possible implementation, the first pilot signal group includes M first pilot signals, and the $i^{th}$ second pilot signal group includes $A_i$ second pilot signals. In this case, S803 may be specifically: The receive side receives signal quality of the M first pilot signals in the first pilot signal group, and obtains signal quality of $\Sigma_i A_i$ second pilot signals in the i second pilot signal groups; and selects B pilot signals according to signal quality of all obtained first pilot signals and signal quality of all second pilot signals, and further sends the precoding feedback information to the transmit side according to the B pilot signals.

B is an integer that is greater than or equal to 1 and less than or equal to $$\sum_i A_i + M.$$

For example, au indicator measuring signal quality of a pilot signal may be a received signal level, an SINR of the signal, or the like. A process of obtaining by the receive side the signal quality of the first pilot signals and the signal quality of the second pilot signals is described using an example in which an indicator measuring signal quality of a pilot signal is an SINR of the signal: The receive side separately measures a power $P_{RS}$ and an interference signal power $P_I$ of the first pilot signal on a resource element occupied by the first pilot signal, and measures a system noise power $P_N$, and then can obtain the SNR of the first pilot signal according to $P_{RS}/(P_I+P_N)$. Similarly, the receive side can obtain the signal quality of the second pilot signal with reference to the process of obtaining the signal quality of the first pilot signal.

Further, in another possible implementation, S803 may be specifically: The receive side obtains a signal capacity of the first pilot signal group, and obtains a signal capacity of each of the i second pilot signal groups; and sends the precoding feedback information to the transmit side according to the obtained signal capacity of the first pilot signal group and the obtained signal capacity of each of the i second pilot signal groups.

For example, an indicator measuring a signal capacity of a pilot signal may be a throughput, an allowed maximum user quantity, or the like. A process of obtaining by the receive side the signal capacity of the first pilot signal group and the signal capacity of the second pilot signal group is described using an example in which an indicator measuring a signal capacity of a pilot signal is a throughput: The receive side can obtain a throughput of each first pilot signal according to an indicator such as a received level or an SINR of the first pilot signal. Similarly, the receive side can obtain the signal capacity of the second pilot signal group with reference to the process of obtaining the signal capacity of the first pilot signal group.

Further, when the receive side sends the precoding feedback information to the transmit side according to signal capacities of pilot signals, in a first possible implementation, when i is equal to 1, if the receive side determines that the signal capacity of the first pilot signal group is less than or equal to the signal capacity of the second pilot signal group, the precoding feedback information sent to the transmit side by the receive side is an acknowledgement indication.

The acknowledgement indication is used to indicate that the precoding matrix used for current data transmission is not used next time the transmit side transmits data.

Further, in a second possible implementation, when i is greater than 1, if the receive side determines that among the i second pilot signal groups, there is one or more second pilot signal groups having a signal capacity greater than the signal capacity of the first pilot signal group, the precoding feedback information sent to the transmit side by the receive side is an acknowledgement indication and an index or indexes for a second precoding matrix or second precoding matrices used for the one or more second pilot signal groups.

The acknowledgement indication is used to indicate that the precoding matrix used for current data transmission is not used next time the transmit side transmits data.

Further, in a third possible implementation, when i is greater than 1 and the i second pilot signal groups are different, if the receive side determines that among the i second pilot signal groups, there is one or more second pilot signal groups having a signal capacity greater than the signal capacity of the first pilot signal group, the precoding feedback information sent to the transmit side by the receive side is an acknowledgement indication and an index or indexes for the one or more second pilot signal groups.

The acknowledgement indication is used to indicate that the precoding matrix used for current data transmission is not used next time the transmit side transmits data.

Further, in a fourth possible implementation, if the receive side determines that the signal capacity of the first pilot signal group is greater than or equal to the signal capacity of the second pilot signal group, the precoding feedback information sent to the transmit side by the receive side is a non-acknowledgement indication.

The non-acknowledgement indication is used to indicate that the precoding matrix used for current data transmission is used next time the transmit side transmits data.

Further, when i is greater than 1, the precoding feedback information sent to the transmit side by the receive side is one or more of an index for the first precoding matrix used for the first pilot signal group and indexes for the second precoding matrices used for the i second pilot signal groups.

Further, when i is greater than 1 and the i second pilot signal groups are different, the precoding feedback information sent to the transmit side by the receive side is one or more of indexes for the first pilot signal group and the i second pilot signal groups.

Further, when the receive side sends the precoding feedback information to the transmit side according to signal quality of a pilot signal, in a possible implementation, the precoding feedback information sent to the transmit side by the receive side is indexes for B precoding vectors of precoding vectors used for the M first pilot signals and precoding vectors used for the $$\sum_i A_i$$

second pilot signals.

Further, in another possible implementation, the precoding feedback information sent to the transmit side by the receive side is indexes for B pilot signals of the M first pilot signals and $$\sum_i A_i$$

second pilot signals.

Figure 7:
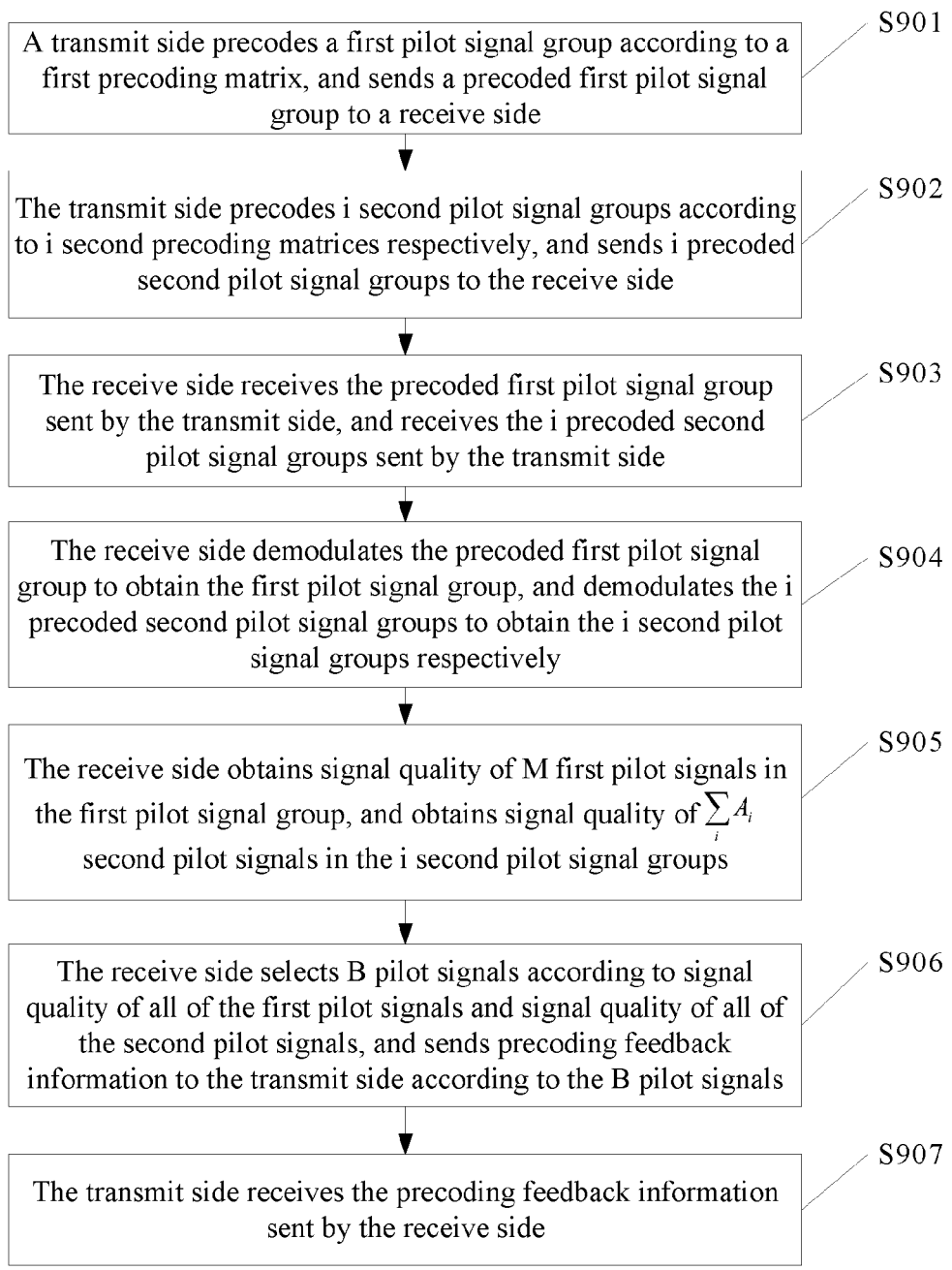
FIG. 7 is a flowchart of a precoding information collection method according to another embodiment of the present invention.

Another embodiment of the present invention provides a precoding information collection method applied to a multi-antenna communications system. The system includes a transmit side and a receive side. There are M data streams used for data transmission between the transmit side and at least one receive side, and M is an integer greater than 1. As shown in FIG. 7, the method may include the following steps.

S901: The transmit side precodes a first pilot signal group according to a first precoding matrix, and sends a precoded first pilot signal group to the receive side.

The first precoding matrix includes M first precoding vectors that are different from each other, the first pilot signal group includes M first pilot signals, and the first precoding matrix is the same as a precoding matrix used for current data transmission.

S902: The transmit side precodes i second pilot signal groups according to i second precoding matrices respectively, and sends i precoded second pilot signal groups to the receive side.

The $i^{th}$ second precoding matrix includes $A_i$ second precoding vectors that are different from each other, the $i^{th}$ second pilot signal group includes $A_i$ second pilot signals, i is an integer greater than or equal to 1, $A_i$ is an integer greater than or equal to 1, the second precoding matrices used for precoding the second pilot signal groups are different from each other, and the i second precoding matrices are different from the first precoding matrix. For example, when i is equal to 2 and $A_i$ is equal to 2, a process of precoding the i second pilot signal groups by the transmit side according to the i second precoding matrices respectively may be: precoding, by the transmit side, one second pilot signal included in the $1^{st}$ second pilot signal group according to the $1^{st}$ second precoding vector included in the $1^{st}$ second precoding matrix, and precoding the other second pilot signal included in the $1^{st}$ second pilot signal group according to the $2^{nd}$ second precoding vector included in the $1^{st}$ second precoding matrix; and similarly, precoding, by the transmit side, one second pilot signal included in the $2^{nd}$ second pilot signal group according to the $1^{st}$ second precoding vector included in the $2^{nd}$ second precoding matrix, and precoding the other second pilot signal included in the $2^{nd}$ second pilot signal group according to the $2^{nd}$ second precoding vector included in the $2^{nd}$ second precoding matrix.

It should be noted that the transmit side may send the i precoded second pilot signal groups to the receive side at a time point the same as when the precoded first pilot signal group is sent, may send the i precoded second pilot signal groups to the receive side at a time point different from when the precoded third pilot signal group is sent, or may send the i precoded second pilot signal groups to the receive side at a frequency different from a frequency at which the precoded first pilot signal group is sent.

S903: The receive side receives the precoded first pilot signal group sent by the transmit side, and receives the i precoded second pilot signal groups sent by the transmit side.

S904: The receive side demodulates the precoded first pilot signal group to obtain the first pilot signal group, and demodulates the i precoded second pilot signal groups to obtain the i second pilot signal groups respectively.

S905: The receive side obtains signal quality of M first pilot signals in the first pilot signal group, and obtains signal quality of $$\sum_i A_i$$

second pilot signals in the i second pilot signal groups.

S906: The receive side selects B pilot signals according to signal quality of all of the first pilot signals and signal quality of all of the second pilot signals, and sends precoding feedback information to the transmit side according to the B pilot signals.

B is an integer that is greater than or equal to 1 and less than or equal to $$\sum_i A_i + M.$$

In a possible implementation, the precoding feedback information sent to the transmit side by the receive side is indexes for B precoding vectors of precoding vectors used for the M first pilot signals and precoding vectors used for the $$\sum_i A_i$$

second pilot signals.

For example, when M is equal to 2, i is equal to 2, and $A_i$ is equal to 2, it may be defined that indexes for first precoding vectors used for precoding the two first pilot signals (the $1^{st}$ first pilot signal and the $2^{nd}$ first pilot signal) included in the first pilot signal group are respectively 000 and 001, that indexes for second precoding vectors used for precoding the two second pilot signals (the $1^{st}$ second pilot signal and the $2^{nd}$ second pilot signal) included in the $1^{st}$ second pilot signal group are respectively 010 and 011, and that indexes for second precoding vectors used for precoding the two second pilot signals (the $1^{st}$ second pilot signal and the $2^{nd}$ second pilot signal) included in the $2^{nd}$ second pilot signal group are respectively 100 and 101. If a selection policy of the receive side is to select two pilot signals that have better signal quality, and the receive side determines that the two second pilot signals included in the $1^{st}$ second pilot signal group have better quality, the precoding feedback information sent to the transmit side by the receive side is 010 and 011.

In another possible implementation, when $$\sum_i A_i + M$$

pilot signals are different, the precoding feedback information sent to the transmit side by the receive side is indexes for B pilot signals of the M first pilot signals and the $$\sum_i A_i$$

second pilot signals.

For example, when M is equal to 2, i is equal to 2, and $A_i$ is equal to 2, it may be defined that indexes for the two first pilot signals (the $1^{st}$ first pilot signal and the $2^{nd}$ first pilot signal) included in the first pilot signal group are 0'0'0' and 0'0'1', that indexes for the two second pilot signals (the $1^{st}$ second pilot signal and the $2^{nd}$ second pilot signal) included in the $1^{st}$ second pilot signal group are respectively 0'1'0' and 0'1'1', and that indexes for the two second pilot signals (the $1^{st}$ second pilot signal and the $2^{nd}$ second pilot signal) included in the $2^{nd}$ second pilot signal group are respectively 1'0'0' and 1'0'1'. If a selection policy of the receive side is to select two pilot signals that have better signal quality, and the receive side determines that the two second pilot signals included in the $1^{st}$ second pilot signal group have better signal quality, the precoding feedback information sent to the transmit side by the receive side is 0'1'0' and 0'1'1'.

It should be noted that the receive side may alternatively send the precoding feedback information to the transmit side according to an interference amount of the first pilot signal group and interference amounts of the i second pilot signal groups. In this embodiment of the present invention, no limitation is imposed herein on a specific implementation in which the receive side sends the precoding feedback information to the transmit side according to the first pilot signal group and the i second pilot signal groups. A corresponding choice may be made as required by an actual application scenario.

S907: The transmit side receives the precoding feedback information sent by the receive side.

The precoding feedback information received by the transmit side may be indexes for B precoding vectors of precoding vectors used for the M first pilot signals and precoding vectors used for the $$\sum_i A_i$$

second pilot signals, or may be indexes for B pilot signals of the M first pilot signals and the $$\sum_i A_i$$

second pilot signals. For example, when the precoding feedback information received by the transmit side is 010 and 011, the transmit side can learn that a precoding matrix used for next data transmission that is recommended by the receive side is a precoding matrix including precoding vectors whose indexes are 010 and 011. When the precoding feedback information received by the transmit side is 0'1'0' and 0'1'1', the transmit side can learn that a precoding matrix used for next data transmission that is recommended by the receive side is a precoding matrix including precoding vectors used for pilot signals whose indexes are 0'1'0' and 0'1'1'.

After the transmit side receives the precoding feedback information sent by the receive side, the transmit side can determine, according to the received precoding feedback information, a precoding matrix used for next data transmission. For example, when the precoding feedback information received by the transmit side is indexes for B precoding vectors of precoding vectors used for the M first pilot signals and precoding vectors used for the $$\sum_i A_i$$

second pilot signals, the transmit side determines that a precoding matrix used for next data transmission is a precoding matrix including the B precoding vectors corresponding to the indexes; when the precoding feedback information received by the transmit side is indexes for B pilot signals of the M first pilot signals and the $$\sum_i A_i$$

second pilot signals, the transmit side determines that a precoding matrix used for next data transmission is a precoding matrix including precoding vectors used for the B pilot signals corresponding to the indexes.

In actual application, in addition to receiving the precoding feedback information sent by the receive side, the transmit side may further receive precoding feedback information sent by multiple other receive sides, and determine, by comprehensively considering the received multiple pieces of precoding feedback information, one precoding matrix that causes the slightest interference to the other receive sides, as a precoding matrix used for next data transmission with the receive side. For example, the precoding matrix used for next data transmission that is determined by the transmit side is a precoding matrix including precoding vectors whose indexes are 010 and 011.

After the transmit side determines the precoding matrix used for next data transmission, the transmit side can transmit data according to the determined precoding matrix. Simultaneously, to ensure that the receive side can correctly demodulate the data transmitted by the transmit side, the transmit side also needs to send a pilot signal used to demodulate the transmitted data. Therefore, in a possible implementation, the transmit side precodes a third pilot signal group according to a third precoding matrix and sends a precoded third pilot signal group to the receive side. In another possible implementation, because a radio channel environment changes in real time, the transmit side also needs to determine whether an error in a precoding matrix determined by the transmit side at a next time point is the smallest. That is, the transmit side also needs to determine whether the precoding matrix determined by the transmit side at the next time point best matches an actual data transmission channel. In other words, the transmit side precodes i fourth pilot signal groups according to i fourth precoding matrices and sends i precoded fourth pilot signal groups to the receive side.

The third precoding matrix is a precoding matrix determined by the transmit side according to the precoding feedback information from the receive side, a quantity of third pilot signals included in the third pilot signal group is equal to a quantity of third precoding vectors included in the third precoding matrix, and the third precoding vectors used for precoding the third pilot signals are different from each other. The $i^{th}$ fourth precoding matrix includes $A_i$ fourth precoding vectors that are different from each other, the $i^{th}$ fourth pilot signal group includes $A_i$ fourth pilot signal, i is an integer greater than or equal to 1, $A_i$ is an integer greater than or equal to 1, the fourth precoding matrices used for the fourth pilot signal groups are different from each other, and the i fourth precoding matrices are different from the third precoding matrix. For example, the third precoding matrix is a precoding matrix obtained by means of reconstruction by using the B precoding vectors sent by the receive side. In a first possible implementation, when a quantity of first precoding vectors included in the first precoding matrix is the same as a quantity of second precoding vectors included in each of the i second precoding matrices, second precoding matrices included in a second precoding matrix are in one-to-one correspondence with the first precoding vectors included in the first precoding matrix. In this case, a process of reconstructing the third precoding matrix by the transmit side according to feedback information may be: updating, by the transmit side, first precoding vectors corresponding to the B precoding vectors corresponding to the indexes to the B precoding vectors corresponding to indexes, and reconstructing the third precoding matrix by using the updated first precoding vectors and non-updated first precoding vectors. In a second possible implementation, when a quantity of first precoding vectors included in the first precoding matrix is different from a quantity of second precoding vectors included in each of the i second precoding matrices, a process of reconstructing the third precoding matrix by the transmit side according to feedback information may be: re-forming, by the transmit side, the third precoding matrix by using the B precoding vectors corresponding to the indexes. For example, the transmit side may precode a third pilot signal group according to a precoding matrix including precoding vectors whose indexes are 010 and 011, and sends a precoded third pilot signal group to a receive side. In this case, a quantity of data streams used for transmitting data between the transmit side and at least one receive side is equal to a quantity of third precoding vectors included in the third precoding matrix, that is, the quantity of data streams used for transmitting data between the transmit side and the at least one receive side is equal to 2.

It should be noted that the transmit side may send the i precoded fourth pilot signal groups to the receive side at a time point the same as when the precoded third pilot signal group is sent, may send the i precoded fourth pilot signal groups to the receive side at a time point different from when the precoded third pilot signal group is sent, or may send the i precoded fourth pilot signal groups to the receive side at a frequency different from a frequency at which the precoded third pilot signal group is sent.

According to the precoding information collection method provided by this embodiment of the present invention, a transmit side sends, to a receive side, a first pilot signal group precoded by using a first precoding matrix and i second pilot signal groups precoded by using i second precoding matrices, and receives precoding feedback information sent by the receive side. This enables the transmit side to adaptively adjust a precoding matrix used for data transmission, according to the precoding feedback information that is sent by the receive side and used to recommend a precoding matrix for the transmit side to transmit data, and further makes the precoding matrix used for data transmission match an actual data transmission channel. In this way, performance of a wireless communications system is improved.

In addition, the transmit side constantly adjusts, according to the received precoding feedback information, a precoding matrix used for next data transmission. This can gradually reduce an error in the precoding matrix used for next data transmission and further improve performance of the wireless communications system.

Figure 8:
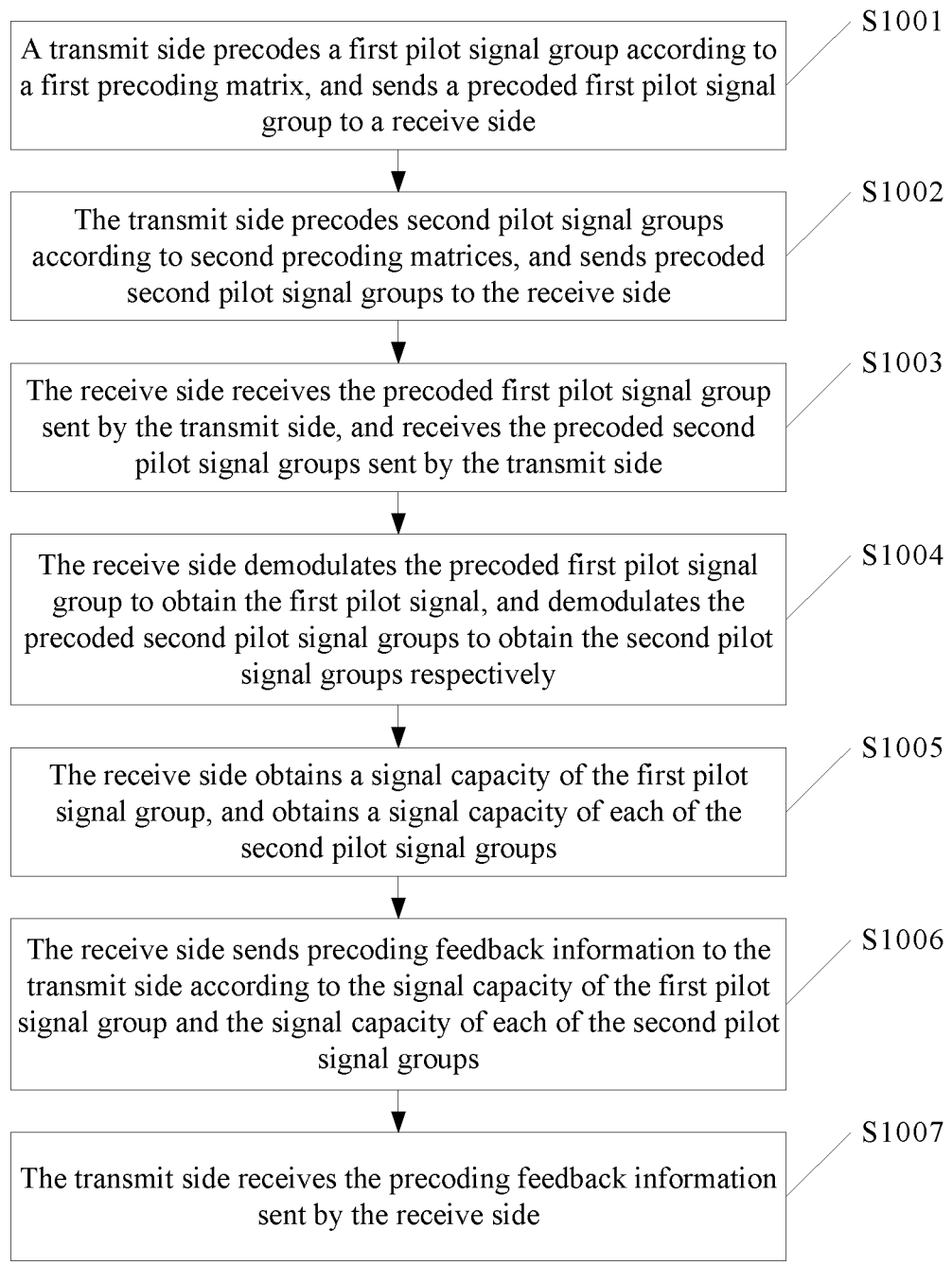
FIG. 8 is a flowchart of a precoding information collection method according to another embodiment of the present invention.

Another embodiment of the present invention provides a precoding information collection method applied to a multi-antenna communications system. The system includes a transmit side and a receive side. There are M data streams used for data transmission between the transmit side and at least one receive side, and M is an integer greater than 1. In a first application scenario, a specific implementation process of the method provided by this embodiment of the present invention is described in detail using an example in which a quantity of second pilot signal groups, i, is equal to 1. As shown in FIG. 8, the method may include the following steps.

S1001: The transmit side precodes a first pilot signal group according to a first precoding matrix, and sends a precoded first pilot signal group to the receive side.

S1002: The transmit side precodes second pilot signal groups according to second precoding matrices, and sends precoded second pilot signal groups to the receive side.

S1003: The receive side receives the precoded first pilot signal group sent by the transmit side, and receives the precoded second pilot signal groups sent by the transmit side.

S1004: The receive side demodulates the precoded first pilot signal group to obtain the first pilot signal, and demodulates the precoded second pilot signal groups to obtain the second pilot signal groups respectively.

S1005: The receive side obtains a signal capacity of the first pilot signal group, and obtains a signal capacity of each of the second pilot signal groups.

S1006: The receive side sends precoding feedback information to the transmit side according to the signal capacity of the first pilot signal group and the signal capacity of each of the second pilot signal groups.

If the receive side determines that the signal capacity of the first pilot signal group is less than or equal to the signal capacity of the second pilot signal group, the precoding feedback information sent to the transmit side by the receive side is an acknowledgement indication. If the receive side determines that the signal capacity of the first pilot signal group is greater than or equal to the signal capacity of the second pilot signal group, the precoding feedback information sent to the transmit side by the receive side is a non-acknowledgement indication.

The acknowledgement indication is used to indicate that the precoding matrix used for current data transmission is not used next time the transmit side transmits data. The non-acknowledgement indication is used to indicate that the precoding matrix used for current data transmission is used next time the transmit side transmits data. For example, there is one bit included in the precoding feedback information sent to the transmit side by the receive side. For example, 0 represents a non-acknowledgement indication, and 1 represents an acknowledgement indication.

It should be noted that the receive side may alternatively send the precoding feedback information to the transmit side according to an interference amount of the first pilot signal group and interference amounts of the i second pilot signal groups. In this embodiment of the present invention, no limitation is imposed herein on a specific implementation in which the receive side sends the precoding feedback information to the transmit side according to the first pilot signal group and the i second pilot signal groups. A corresponding choice may be made as required by an actual application scenario.

S1007: The transmit side receives the precoding feedback information sent by the receive side.

The precoding feedback information received by the transmit side may be an acknowledgement indication, or may be a non-acknowledgement indication. For example, when the precoding feedback information received by the transmit side is 1, the transmit side can learn that the receive side recommends that the precoding matrix used for current data transmission not be used for next data transmission. That is, the transmit side can learn that the precoding matrix used for current data transmission needs to be updated.

After the transmit side receives the precoding feedback information sent by the receive side, the transmit side can determine, according to the received precoding feedback information, a precoding matrix used for next data transmission. For example, when the precoding feedback information received by the transmit side is an acknowledgement indication, the transmit side determines that the precoding matrix used for next data transmission is the second precoding matrix; when the precoding feedback information received by the transmit side is a non-acknowledgement indication, the transmit side determines that the precoding matrix used for next data transmission is the first precoding matrix.

In actual application, in addition to receiving the precoding feedback information sent by the receive side, the transmit side may further receive precoding feedback information sent by multiple other receive sides, and determine, by comprehensively considering the received multiple pieces of precoding feedback information, one precoding matrix that causes the slightest interference to the other receive sides, as a precoding matrix used for next data transmission with the receive side. For example, the precoding matrix used for next data transmission that is determined by the transmit side is the second precoding matrix.

It should be noted that for descriptions in S1001 to S1007 in this embodiment of the present invention, reference may be made to descriptions in S901 to S907 in the foregoing embodiment of the present invention. No further details are described herein in this embodiment of the present invention.

Figure 9:
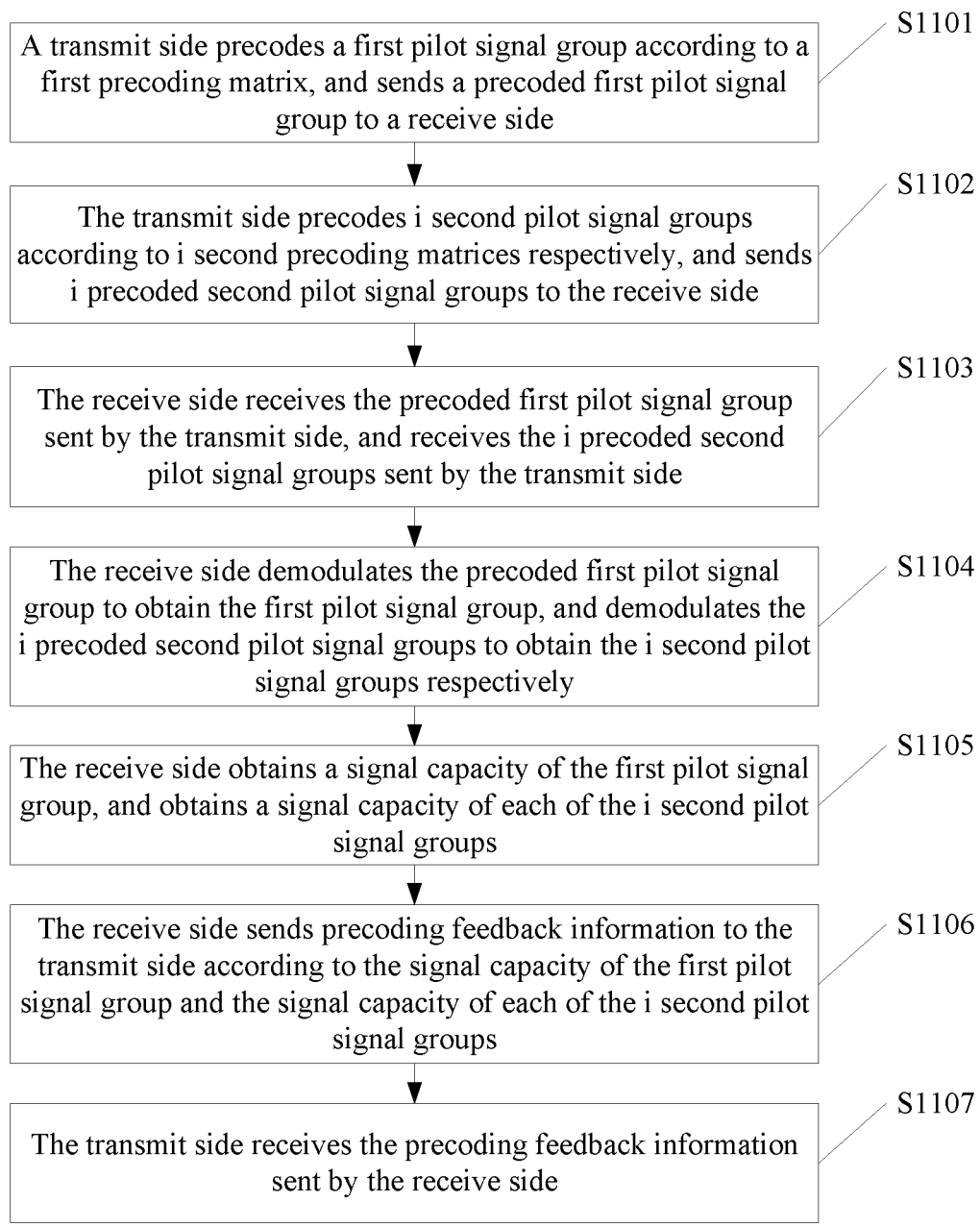
FIG. 9 is a flowchart of another precoding information collection method according to another embodiment of the present invention.

In a second application scenario, a specific implementation process of the precoding information collection method provided by this embodiment of the present invention is described in detail using an example in which a quantity of second pilot signal groups, i, is greater than 1. As shown in FIG. 9, the method may include the following steps.

S1101: A transmit side precodes a first pilot signal group according to a first precoding matrix, and sends a precoded first pilot signal group to a receive side.

S1102: The transmit side precodes i second pilot signal groups according to i second precoding matrices respectively, and sends i precoded second pilot signal groups to the receive side.

The i second pilot signal groups may be the same, or may be different.

S1103: The receive side receives the precoded first pilot signal group sent by the transmit side, and receives the i precoded second pilot signal groups sent by the transmit side.

S1104: The receive side demodulates the precoded first pilot signal group to obtain the first pilot signal group, and demodulates the i precoded second pilot signal groups to obtain the i second pilot signal groups respectively.

S1105: The receive side obtains a signal capacity of the first pilot signal group, and obtains a signal capacity of each of the i second pilot signal groups.

S1106: The receive side sends precoding feedback information to the transmit side according to the signal capacity of the first pilot signal group and the signal capacity of each of the i second pilot signal groups.

In a possible implementation, if the receive side determines that among the i second pilot signal groups, there is one or more second pilot signal groups having a signal capacity greater than the signal capacity of the first pilot signal group, the precoding feedback information sent to the transmit side by the receive side is an acknowledgement indication and an index or indexes for a second precoding matrix or second precoding matrices used for the one or more second pilot signal groups. If the receive side determines that the signal capacity of the first pilot signal group is greater than or equal to the signal capacity of the second pilot signal group, the precoding feedback information sent to the transmit side by the receive side is a non-acknowledgement indication.

The acknowledgement indication is used to indicate that the precoding matrix used for current data transmission is not used next time the transmit side transmits data. The non-acknowledgement indication is used to indicate that the precoding matrix used for current data transmission is used next time the transmit side transmits data. For example, when i is equal to 2, because there are three pilot signal groups, it may be defined that an index for the first precoding matrix used for precoding the first pilot signal group is 00, and that indexes for second precoding matrices used for precoding the two second pilot signal groups (the $1^{st}$ second pilot signal group and the $2^{nd}$ second pilot signal group) are respectively 01 and 10. If a selection policy of the receive side is to select a pilot signal group that has the greatest signal capacity, and the receive side determines that the $2^{nd}$ second pilot signal group has the greatest signal capacity, the precoding feedback information sent to the transmit side by the receive side is 1 and 10.

In another possible implementation, the precoding feedback information sent to the transmit side by the receive side is one or more of an index for the first precoding matrix used for the first pilot signal group and indexes for the second precoding matrices used for the i second pilot signal groups.

For example, when i is equal to 2, because there are three pilot signal groups, it may be defined that an index for the first precoding matrix used for precoding the first pilot signal group is 00, and that indexes for second precoding matrices used for precoding the two second pilot signal groups (the $1^{st}$ second pilot signal group and the $2^{nd}$ second pilot signal group) are respectively 01 and 10. If a selection policy of the receive side is to select a pilot signal group that has the greatest signal capacity, and the receive side determines that the $2^{nd}$ second pilot signal group has the greatest signal capacity, the precoding feedback information sent to the transmit side by the receive side is 10.

It should be noted that the receive side may alternatively send the precoding feedback information to the transmit side according to an interference amount of the first pilot signal group and interference amounts of the i second pilot signal groups. In this embodiment of the present invention, no limitation is imposed herein on a specific implementation in which the receive side sends the precoding feedback information to the transmit side according to the first pilot signal group and the i second pilot signal groups. A corresponding choice may be made as required by an actual application scenario.

S1107: The transmit side receives the precoding feedback information sent by the receive side.

The precoding feedback information received by the transmit side may be an acknowledgement indication or an index or indexes for a second precoding matrix or second precoding matrices used for the one or more second pilot signal groups, may be a non-acknowledgement indication, or may be one or more of an index for the first precoding matrix used for the first pilot signal and indexes for the second precoding matrices used for the i second pilot signal groups. When the precoding feedback information received by the transmit side is 1 and 10, according to the received precoding feedback information, the transmit side can not only clearly learn that the receive side recommends that the precoding matrix used for current data transmission not be used for next data transmission, but also learn that a precoding matrix used for next data transmission that is recommended by the receive side is a second precoding matrix whose index is 10. When the precoding feedback information received by the transmit side is 0, the transmit side can learn, according to the received precoding feedback information, that the receive side recommends that the precoding matrix used for current data transmission be used for next data transmission. When the precoding feedback information received by the transmit side is 10, the transmit side can learn, according to the received precoding feedback information, that a precoding matrix used for next data transmission that is recommended by the receive side is a second precoding matrix whose index is 10.

After the transmit side receives the precoding feedback information sent by the receive side, the transmit side can determine, according to the received precoding feedback information, a precoding matrix used for next data transmission. For example, when the precoding feedback information received by the transmit side is an acknowledgement indication and an index or indexes for a second precoding matrix or second precoding matrices used for the one or more second pilot signal groups, the transmit side determines that the precoding matrix used for next data transmission is a second precoding matrix corresponding to an index; when the precoding feedback information received by the transmit side is a non-acknowledgement indication, the transmit side determines that the precoding matrix used for next data transmission is the first precoding matrix; when the precoding feedback information received by the transmit side is one or more of an index for the first precoding matrix used for the first pilot signal group and indexes for the second precoding matrices used for the i second pilot signal groups, the transmit side determines that the precoding matrix used for next data transmission is a precoding matrix corresponding to an index.

In actual application, in addition to receiving the precoding feedback information sent by the receive side, the transmit side may further receive precoding feedback information sent by multiple other receive sides, and determine, by comprehensively considering the received multiple pieces of precoding feedback information, one precoding matrix that causes the slightest interference to the other receive sides, as a precoding matrix used for next data transmission with the receive side. For example, the precoding matrix used for next data transmission that is determined by the transmit side is a second precoding matrix whose index is 10.

It should be noted that for descriptions in S1101 to S1107 in this embodiment of the present invention, reference may be made to descriptions in S901 to S907 in the foregoing embodiment of the present invention. No further details are described herein in this embodiment of the present invention.

In a third application scenario, a specific implementation process of the precoding information collection method provided by this embodiment of the present invention is described in detail still using an example of a flowchart of the precoding information collection method shown in FIG. 9 where a quantity of second pilot signal groups, i, is greater than 1, and the second pilot signal groups are different. In the application scenario, the method may include the following steps.

S1201: A transmit side precodes a first pilot signal group according to a first precoding matrix, and sends a precoded first pilot signal group to the receive side.

S1202: The transmit side precodes i second pilot signal groups according to i second precoding matrices respectively, and sends i precoded second pilot signal groups to the receive side.

S1203: The receive side receives a precoded first pilot signal group sent by the transmit side, and receives i precoded second pilot signal groups sent by the transmit side.

S1204: The receive side demodulates the precoded first pilot signal group to obtain the first pilot signal group, and demodulates the i precoded second pilot signal groups to obtain the i second pilot signal groups respectively.

S1205: The receive side obtains a signal capacity of the first pilot signal group, and obtains a signal capacity of each of the i second pilot signal groups.

S1206: The receive side sends precoding feedback information to the transmit side according to the signal capacity of the first pilot signal group and the signal capacity of each of the i second pilot signal groups.

Further, in a possible implementation, if the receive side determines that among the i second pilot signal groups, there is one or more second pilot signal groups having a signal capacity greater than the signal capacity of the first pilot signal group, the precoding feedback information sent to the transmit side by the receive side is an acknowledgement indication and an index or indexes for the one or more second pilot signal groups. If the receive side determines that the signal capacity of the first pilot signal group is greater than or equal to the signal capacity of the second pilot signal group, the precoding feedback information sent to the transmit side by the receive side is a non-acknowledgement indication.

The acknowledgement indication is used to indicate that the precoding matrix used for current data transmission is not used next time the transmit side transmits data. The non-acknowledgement indication is used to indicate that the precoding matrix used for current data transmission is used next time the transmit side transmits data. For example, when i is equal to 2, because there are three pilot signal groups, it may be defined that an index for the first pilot signal group is 0'0', and that indexes for the two second pilot signal groups (the $1^{st}$ second pilot signal group and the $2^{nd}$ second pilot signal group) are respectively 0'1' and 1'0'. If a selection policy of the receive side is to select a pilot signal group that has the greatest signal capacity, and the receive side determines that the $2^{nd}$ second pilot signal group has the greatest signal capacity, the precoding feedback information sent to the transmit side by the receive side is 1 and 1'0'.

In another possible implementation, the precoding feedback information sent to the transmit side by the receive side is one or more of indexes for the first pilot signal group and the i second pilot signal groups.

For example, when i is equal to 2, because there are three pilot signal groups, it may be defined that an index for the first pilot signal group is 0'0', and that indexes for the two second pilot signal groups (the $1^{st}$ second pilot signal group and the $2^{nd}$ second pilot signal group) are respectively 0'1' and 1'0'. If a selection policy of the receive side is to select a pilot signal group that has the greatest signal capacity, and the receive side determines that the $2^{nd}$ second pilot signal group has the greatest signal capacity, the precoding feedback information sent to the transmit side by the receive side is 1'0'.

It should be noted that the receive side may alternatively send the precoding feedback information to the transmit side according to an interference amount of the first pilot signal group and interference amounts of the i second pilot signal groups. In this embodiment of the present invention, no limitation is imposed herein on a specific implementation in which the receive side sends the precoding feedback information to the transmit side according to the first pilot signal group and the i second pilot signal groups. A corresponding choice may be made as required by an actual application scenario.

S1207: The transmit side receives the precoding feedback information sent by the receive side.

The precoding feedback information received by the transmit side may be an acknowledgement indication or an index or indexes for the one or more second pilot signal groups, may be a non-acknowledgement indication, or may be one or more of an index for the first pilot signal group and indexes for the i second pilot signal groups. When the precoding feedback information received by the transmit side is 1 and 1'0', according to the received precoding feedback information, the transmit side can not only clearly learn that the receive side recommends that the precoding matrix used for current data transmission not be used for next data transmission, but also learn that a precoding matrix used for next data transmission that is recommended by the receive side is a second precoding matrix used for a second pilot signal group whose index is 1'0'. When the precoding feedback information received by the transmit side is 0, the transmit side can learn, according to the received precoding feedback information, that the receive side recommends that the precoding matrix used for current data transmission be used for next data transmission. When the precoding feedback information received by the transmit side is 1'0', the transmit side can learn, according to the received precoding feedback information, that a precoding matrix used for next data transmission that is recommended by the receive side is a second precoding matrix used for a second pilot signal group whose index is 1'0'.

After the transmit side receives the precoding feedback information sent by the receive side, the transmit side can determine, according to the received precoding feedback information, a precoding matrix used for next data transmission. For example, when the precoding feedback information received by the transmit side is the acknowledgement indication and the index or indexes for the one or more second pilot signal groups, the transmit side determines that the precoding matrix used for next data transmission is a second precoding matrix used for a second pilot signal group corresponding to an index; when precoding feedback information received by the transmit side is the non-acknowledgement indication, the transmit side determines that the precoding matrix used for next data transmission is the first precoding matrix; when the recoding feedback information received by the transmit side is one or more of an index for the first pilot signal group and indexes for the i second pilot signal groups, the transmit side determines that the precoding matrix used for next data transmission is a precoding matrix used for a pilot signal group corresponding to an index.

In actual application, in addition to receiving the precoding feedback information sent by the receive side, the transmit side may further receive precoding feedback information sent by multiple other receive sides, and determine, by comprehensively considering the received multiple pieces of precoding feedback information, one precoding matrix that causes the slightest interference to the other receive sides, as a precoding matrix used for next data transmission with the receive side. For example, the precoding matrix used for next data transmission that is determined by the transmit side is a second precoding matrix used for a second pilot signal group whose index is 1'0'.

It should be noted that for descriptions in S1201 to S1207 in this embodiment of the present invention, reference may be made to descriptions in S901 to S907 in the foregoing embodiment of the present invention. No further details are described herein in this embodiment of the present invention.

According to the precoding information collection method provided by this embodiment of the present invention, a transmit side sends, to a receive side, a first pilot signal group precoded by using a first precoding matrix and i second pilot signal groups precoded by using i second precoding matrices, and receives precoding feedback information sent by the receive side. This enables the transmit side to adaptively adjust a precoding matrix used for data transmission, according to the precoding feedback information that is sent by the receive side and used to recommend a precoding matrix for the transmit side to transmit data, and further makes the precoding matrix used for data transmission match an actual data transmission channel. In this way, performance of a wireless communications system is improved.

In addition, the transmit side constantly adjusts, according to the received precoding feedback information, a precoding matrix used for next data transmission. This can gradually reduce an error in the precoding matrix used for next data transmission and further improve performance of the wireless communications system.

Figure 10:
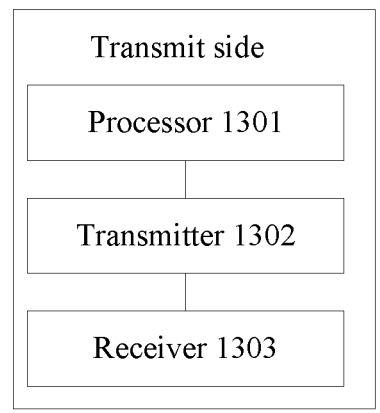
FIG. 10 is a schematic composition diagram of a transmit side according to an embodiment of the present invention.

Another embodiment of the present invention provides a transmit side. As shown in FIG. 10, the transmit side includes a processor 1301, a transmitter 1302, and a receiver 1303.

The processor 1301 is configured to precode a first pilot signal according to a first precoding matrix. The first precoding matrix is the same as a precoding matrix used for current data transmission.

The transmitter 1302 is configured to send, to a receive side, a precoded first pilot signal obtained by the processor 1301.

The processor 1301 is further configured to precode N second pilot signals according to N second precoding matrices. N is an integer greater than or equal to 1, the second precoding matrices used for precoding the second pilot signals are different from each other, and the N second precoding matrices are different from the first precoding matrix.

Specifically, the processor 1301 precodes the $1^{st}$ second pilot signal according to the $1^{st}$ second precoding matrix, the processor 1301 precodes the $2^{nd}$ second pilot signal according to the $2^{nd}$ second precoding matrix, and by analogy, the processor 1301 precodes the $N^{th}$ second pilot signal according to the $N^{th}$ second precoding matrix. For example, different second precoding matrices may be obtained according to different precoding matrices for correction and the first precoding matrix. For example, the $1^{st}$ second precoding matrix is equal to a sum of the $1^{st}$ precoding matrix for correction and the first precoding matrix, the $2^{nd}$ second precoding matrix is equal to a sum of the $2^{nd}$ precoding matrix for correction and the first precoding matrix, and by analogy, the $N^{th}$ second precoding matrix is equal to a sum of the $N^{th}$ precoding matrix for correction and the first precoding matrix. The N precoding matrices for correction are generated by the processor 1301 randomly, and a probability that distribution of the N precoding matrix for correction is within a preset range is greater than 0. For example, distribution of the N precoding matrices for correction may be uniform distribution with a constant feature, may be Gaussian distribution, or may be feature-varying uniform distribution.

The transmitter 1302 is further configured to send, to the receive side, N precoded second pilot signals obtained by the processor 1301.

It should be noted that the transmitter 1302 may send the precoded second pilot signal to the receive side at a time point the same as when the precoded first pilot signal is sent, may send the precoded second pilot signal to the receive side at a time point different from when the precoded first pilot signal is sent, or may send the precoded second pilot signal to the receive side at a frequency different from a frequency at which the precoded first pilot signal is sent.

The receiver 1303 is configured to receive precoding feedback information sent by the receive side.

The precoding feedback information may be understood as information related to a precoding matrix that the receive side recommends the transmit side to use for next data transmission.

In this embodiment of the present invention, further, when N is equal to 1, the precoding feedback information is an acknowledgement indication used to indicate that the precoding matrix used for current data transmission is not used for next data transmission.

In this embodiment of the present invention, further, when N is greater than 1, the precoding feedback information is an acknowledgement indication and one or more of indexes for the N second precoding matrices, where the acknowledgement indication is used to indicate that the precoding matrix used for current data transmission is not used for next data transmission.

In this embodiment of the present invention, further, when N is greater than 1 and the N second pilot signals are different, the precoding feedback information is an acknowledgement indication and one or more of indexes for the N second pilot signals, where the acknowledgement indication is used to indicate that the precoding matrix used for current data transmission is not used for next data transmission.

In this embodiment of the present invention, further, the precoding feedback information is a non-acknowledgement indication used to indicate that the precoding matrix used for current data transmission is used for next data transmission.

In this embodiment of the present invention, further, when N is greater than 1, the precoding feedback information is one or more of indexes for the first precoding matrix and the N second precoding matrices.

In this embodiment of the present invention, further, when N is greater than 1 and the N second pilot signals are different, the precoding feedback information is one or more of indexes for the first pilot signal and the N second pilot signals.

In this embodiment of the present invention, further, data is transmitted between the transmit side and the receive side in a single-stream manner.

After the receiver 1303 receives the precoding feedback information sent by the receive side, the processor 1301 can determine, according to the received precoding feedback information, a precoding matrix used for next data transmission and transmit data according to the determined precoding matrix.

In actual application, in addition to receiving the precoding feedback information sent by the receive side, the receiver 1303 may further receive precoding feedback information sent by multiple other receive sides. In this case, the processor 1301 needs to determine, by comprehensively considering the received multiple pieces of precoding feedback information, one precoding matrix that causes the slightest interference to the other receive sides, as a precoding matrix used for next data transmission with the receive side.

The transmit side provided by this embodiment of the present invention sends, to a receive side, a first pilot signal precoded by using a first precoding matrix and N second pilot signals precoded by using N second precoding matrices, and receives precoding feedback information sent by the receive side. This enables the transmit side to adaptively adjust a precoding matrix used for data transmission, according to the precoding feedback information that is sent by the receive side and used to recommend a precoding matrix for the transmit side to transmit data, and further makes the precoding matrix used for data transmission match an actual data transmission channel. In this way, performance of a wireless communications system is improved.

In addition, the transmit side constantly adjusts, according to the received precoding feedback information, a precoding matrix used for next data transmission. This can gradually reduce an error in the precoding matrix used for next data transmission and further improve performance of the wireless communications system.

Figure 11:
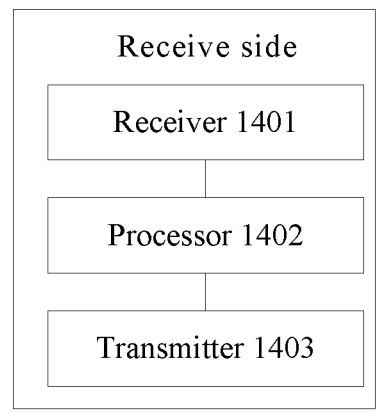
FIG. 11 is a schematic composition diagram of a receive side according to another embodiment of the present invention.

Another embodiment of the present invention provides a receive side. As shown in FIG. 11, the receive side includes a receiver 1401, a processor 1402, and a transmitter 1403.

The receiver 1401 is configured to receive a precoded first pilot signal sent by a transmit side, and receive N precoded second pilot signals sent by the transmit side. N is an integer greater than or equal to 1.

The processor 1402 is configured to demodulate the precoded first pilot signal received by the receiver 1401 to obtain a first pilot signal, and demodulate the N precoded second pilot signals received by the receiver 1401 to obtain N second pilot signals respectively.

The transmitter 1403 is configured to send precoding feedback information to the transmit side according to the first pilot signal and the N second pilot signals that are obtained by the processor.

In this embodiment of the present invention, further, the transmitter 1403 is specifically configured to: obtain signal quality of the first pilot signal, and obtain signal quality of each of the N second pilot signals; and send the precoding feedback information to the transmit side according to the signal quality of the first pilot signal and the signal quality of each of the N second pilot signals.

In this embodiment of the present invention, further, the transmitter 1403 is specifically configured to: obtain a signal capacity of the first pilot signal, and obtain a signal capacity of each of the N second pilot signals; and send the precoding feedback information to the transmit side according to the signal capacity of the first pilot signal and the signal capacity of each of the N second pilot signals.

Nevertheless, the transmitter 1403 may alternatively send the precoding feedback information to the transmit side according to an interference amount of the first pilot signal and an interference amount of the second pilot signal. In this embodiment of the present invention, no limitation is imposed herein on a specific implementation in which the transmitter 1403 sends the precoding feedback information to the transmit side according to the first pilot signal and the N second pilot signals. A corresponding choice may be made as required by an actual application scenario.

In this embodiment of the present invention, further, when N is equal to 1, if the signal quality of the first pilot signal is inferior or equal to the signal quality of the second pilot signal, or the signal capacity of the first pilot signal is less than or equal to the signal capacity of the second pilot signal, the precoding feedback information is an acknowledgement indication used to indicate that the precoding matrix used for current data transmission is not used next time the transmit side transmits data.

In this embodiment of the present invention, further, when N is greater than 1, if among the N second pilot signals, there is one or more second pilot signals having signal quality superior to the signal quality of the first pilot signal, or one or more second pilot signals having a signal capacity greater than the signal capacity of the first pilot signal, the precoding feedback information is an acknowledgement indication and an index or indexes for a second precoding matrix or second precoding matrices used for the one or more second pilot signals, where the acknowledgement indication is used to indicate that the precoding matrix used for current data transmission is not used next time the transmit side transmits data.

In this embodiment of the present invention, further, when N is greater than 1 and the N second pilot signals are different, if among the N second pilot signals, there is one or more second pilot signals having signal quality superior to the signal quality of the first pilot signal, or one or more second pilot signals having a signal capacity greater than the signal capacity of the first pilot signal, the precoding feedback information is an acknowledgement indication and an index or indexes for the one or more second pilot signals, where the acknowledgement indication is used to indicate that the precoding matrix used for current data transmission is not used next time the transmit side transmits data.

In this embodiment of the present invention, further, if the signal quality of the first pilot signal is superior or equal to the signal quality of the second pilot signal, or the signal capacity of the first pilot signal is greater than or equal to the signal capacity of the second pilot signal, the precoding feedback information is a non-acknowledgement indication used to indicate that the precoding matrix used for current data transmission is used next time the transmit side transmits data.

In this embodiment of the present invention, further, when N is greater than 1, the precoding feedback information is one or more of an index for a first precoding matrix used for the first pilot signal and indexes for second precoding matrices used for the N second pilot signals.

In this embodiment of the present invention, further, when N is greater than 1 and the N second pilot signals are different, the precoding feedback information is one or more of indexes for the first pilot signal and the N second pilot signals.

In this embodiment of the present invention, further, data is transmitted between the transmit side and the receive side in a single-stream manner.

After receiving a precoded first pilot signal and N precoded second pilot signals that are sent by a transmit side, the receive side provided by this embodiment of the present invention demodulates the precoded first pilot signal to obtain a first pilot signal, and demodulates the N precoded second pilot signals to obtain N second pilot signals respectively; and sends, to the transmit side according to the first pilot signal and the N second pilot signals that are obtained, precoding feedback information used to recommend a precoding matrix for the transmit side to transmit data. This enables the transmit side to adaptively adjust, according to the precoding feedback information sent by the receive side, a precoding matrix used for data transmission, and further makes the precoding matrix used for data transmission match an actual data transmission channel. In this way, performance of a wireless communications system is improved.

Figure 12:
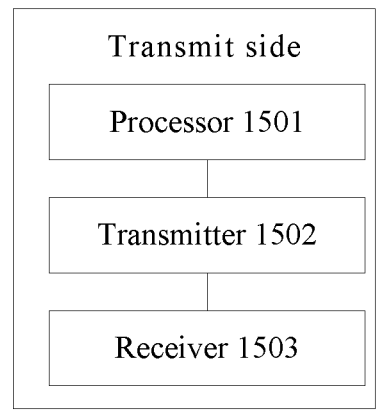
FIG. 12 is a schematic composition diagram of a transmit side according to another embodiment of the present invention.

Another embodiment of the present invention provides a transmit side. There are M data streams used for data transmission between the transmit side and at least one receive side, and M is an integer greater than 1. As shown in FIG. 12, the transmit side includes a processor 1501, a transmitter 1502, and a receiver 1503.

The processor 1501 is configured to precode a first pilot signal group according to a first precoding matrix. The first precoding matrix includes M first precoding vectors that are different from each other, the first pilot signal group includes M first pilot signals, and the first precoding matrix is the same as a precoding matrix used for current data transmission.

The transmitter 1502 is configured to send, to the receive side, a precoded first pilot signal group obtained by the processor 1501.

The processor 1501 is further configured to precode i second pilot signal groups according to i second precoding matrices respectively. The $i^{th}$ second precoding matrix includes $A_i$ second precoding vectors that are different from each other, the $i^{th}$ second pilot signal group includes $A_i$ second pilot signals, i is an integer greater than or equal to 1, $A_i$ is an integer greater than or equal to 1, the second precoding matrices used for precoding the second pilot signal groups are different from each other, and the i second precoding matrices are different from the first precoding matrix.

The transmitter 1502 is further configured to send, to the receive side, i precoded second pilot signal groups obtained by the processor 1501.

It should be noted that the transmitter 1502 may send the precoded second pilot signal to the receive side at a time point the same as when the precoded first pilot signal is sent, may send the precoded second pilot signal to the receive side at a time point different from when the precoded first pilot signal is sent, or may send the precoded second pilot signal to the receive side at a frequency different from a frequency at which the precoded first pilot signal is sent.

The receiver 1503 is configured to receive precoding feedback information sent by the receive side.

The precoding feedback information may be understood as information related to a precoding matrix that the receive side recommends the transmit side to use for next data transmission.

In this embodiment of the present invention, further, when i is equal to 1, the precoding feedback information is an acknowledgement indication used to indicate that the precoding matrix used for current data transmission is not used for next data transmission.

In this embodiment of the present invention, further, when i is greater than 1, the precoding feedback information is an acknowledgement indication and one or more of indexes for the i second precoding matrices, where the acknowledgement indication is used to indicate that the precoding matrix used for current data transmission is not used for next data transmission.

In this embodiment of the present invention, further, when i is greater than 1 and the i second pilot signal groups are different, the precoding feedback information is an acknowledgement indication and one or more of indexes for the i second pilot signal groups, where the acknowledgement indication is used to indicate that the precoding matrix used for current data transmission is not used for next data transmission.

In this embodiment of the present invention, further, the precoding feedback information is a non-acknowledgement indication used to indicate that the precoding matrix used for current data transmission is used for next data transmission.

In this embodiment of the present invention, further, when i is greater than 1, the precoding feedback information is one or more of indexes for the first precoding matrix and the i second precoding matrices.

In this embodiment of the present invention, further, when i is greater than 1 and the i second pilot signal groups are different, the precoding feedback information is one or more of indexes for the first pilot signal group and the i second pilot signal groups.

In this embodiment of the present invention, further, the precoding feedback information is indexes for B precoding vectors of precoding vectors used for the M first pilot signals and precoding vectors used for $$\sum_i A_i$$

second pilot signals. B is an integer that is greater than or equal to 1 and less than or equal to $$\sum_i A_i + M.$$

In this embodiment of the present invention, further, the precoding feedback information is indexes for B pilot signals of the M first pilot signals and $$\sum_i A_i$$

second pilot signals. B is an integer that is greater than or equal to 1 and less than or equal to $$\sum_i A_i + M.$$

After the receiver 1503 receives the precoding feedback information sent by the receive side, the processor 1501 can determine, according to the received precoding feedback information, a precoding matrix used for next data transmission and transmit data according to the determined precoding matrix.

In actual application, in addition to receiving the precoding feedback information sent by the receive side, the receiver 1503 may further receive precoding feedback information sent by multiple other receive sides. In this case, the processor 1501 needs to determine, by comprehensively considering the received multiple pieces of precoding feedback information, one precoding matrix that causes the slightest interference to the other receive sides, as a precoding matrix used for next data transmission with the receive side.

The transmit side provided by this embodiment of the present invention sends, to a receive side, a first pilot signal group precoded by using a first precoding matrix and i second pilot signal groups precoded by using i second precoding matrices, and receives precoding feedback information sent by the receive side. This enables the transmit side to adaptively adjust a precoding matrix used for data transmission, according to the precoding feedback information that is sent by the receive side and used to recommend a precoding matrix for the transmit side to transmit data, and further makes the precoding matrix used for data transmission match an actual data transmission channel. In this way, performance of a wireless communications system is improved.

In addition, the transmit side constantly adjusts, according to the received precoding feedback information, a precoding matrix used for next data transmission. This can gradually reduce an error in the precoding matrix used for next data transmission and further improve performance of the wireless communications system.

Figure 13:
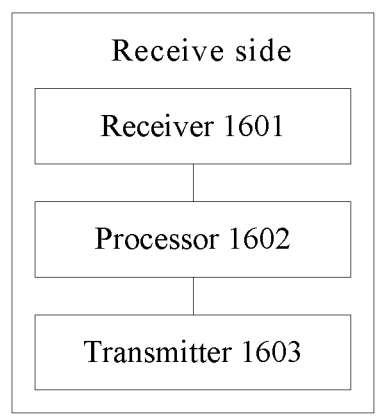
FIG. 13 is a schematic composition diagram of a receive side according to another embodiment of the present invention.

Another embodiment of the present invention provides a receive side. There are M data streams used for data transmission between the receive side and a transmit side, and M is an integer greater than 1. As shown in FIG. 13, the receive side may include a receiver 1601, a processor 1602, and a transmitter 1603.

The receiver 1601 is configured to receive a precoded first pilot signal group sent by the transmit side, and receive i precoded second pilot signal groups sent by the transmit side, where i is an integer greater than or equal to 1.

The processor 1602 is configured to demodulate the precoded first pilot signal group received by the receiver 1601 to obtain a first pilot signal group, and demodulate the i precoded second pilot signal groups received by the receiver 1601 to obtain i second pilot signal groups respectively.

The transmitter 1603 is configured to send precoding feedback information to the transmit side according to the first pilot signal group and the i second pilot signal groups that are obtained by the processor 1602.

In this embodiment of the present invention, further, the first pilot signal group includes M first pilot signals, and the $i^{th}$ second pilot signal group includes $A_i$ second pilot signals.

The transmitter 1603 is specifically configured to obtain signal quality of the M first pilot signals in the first pilot signal group, and obtain signal quality or $$\sum_i A_i$$

second pilot signals in the i second pilot signal groups; and select B pilot signals according to signal quality of all of the first pilot signals and signal quality of all of the second pilot signals, and send the precoding feedback information to the transmit side according to the B pilot signals. B is an integer that is greater than or equal to 1 and less than or equal to $$\sum_i A_i + M.$$

In this embodiment of the present invention, further, the transmitter 1603 is specifically configured to: obtain a signal capacity of the first pilot signal group, and obtain a signal capacity of each of the i second pilot signal groups; and send the precoding feedback information to the transmit side according to the signal capacity of the first pilot signal group and the signal capacity of each of the i second pilot signal groups.

It should be noted that the transmitter 1603 may alternatively send the precoding feedback information to the transmit side according to an interference amount of the first pilot signal group and interference amounts of the i second pilot signal groups. In this embodiment of the present invention, no limitation is imposed herein on a specific implementation in which the transmitter 1603 sends the precoding feedback information to the transmit side according to the first pilot signal group and the i second pilot signal groups. A corresponding choice may be made as required by an actual application scenario.

In this embodiment of the present invention, further, when i is equal to 1, if the signal capacity of the first pilot signal group is less than or equal to the signal capacity of the second pilot signal group, the precoding feedback information is an acknowledgement indication used to indicate that the precoding matrix used for current data transmission is not used next time the transmit side transmits data.

In this embodiment of the present invention, further, when i is greater than 1, if among the i second pilot signal groups, there is one or more second pilot signal groups having a signal capacity greater than the signal capacity of the first pilot signal group, the precoding feedback information is an acknowledgement indication and an index or indexes for a second precoding matrix or second precoding matrices used for the one or more second pilot signal groups, where the acknowledgement indication is used to indicate that the precoding matrix used for current data transmission is not used next time the transmit side transmits data.

In this embodiment of the present invention, further, when i is greater than 1 and the i second pilot signal groups are different, if among the i second pilot signal groups, there is one or more second pilot signal groups having a signal capacity greater than the signal capacity of the first pilot signal group, the precoding feedback information is an acknowledgement indication and an index or indexes for the one or more second pilot signal groups, where the acknowledgement indication is used to indicate that the precoding matrix used for current data transmission is not used next time the transmit side transmits data.

In this embodiment of the present invention, further, if the signal capacity of the first pilot signal group is greater than or equal to the signal capacity of the second pilot signal group, the precoding feedback information is a non-acknowledgement indication used to indicate that the precoding matrix used for current data transmission is used next time the transmit side transmits data.

In this embodiment of the present invention, further, when i is greater than 1, the precoding feedback information is one or more of an index for the first precoding matrix used for the first pilot signal group and indexes for the second precoding matrices used for the i second pilot signal groups.

In this embodiment of the present invention, further, when i is greater than 1 and the i second pilot signal groups are different, the precoding feedback information is one or more of indexes for the first pilot signal group and the i second pilot signal groups.

In this embodiment of the present invention, further, the precoding feedback information is indexes for B precoding vectors of precoding vectors used for the M first pilot signals and precoding vectors used for the $$\sum_i A_i$$

second pilot signals.

In this embodiment of the present invention, further, the precoding feedback information is indexes for B pilot signals of the M first pilot signals and the $$\sum_i A_i$$

second pilot signals.

After receiving a precoded first pilot signal group and i precoded second pilot signal groups that are sent by a transmit side, the receive side provided by this embodiment of the present invention demodulates the precoded first pilot signal group to obtain a first pilot signal group, and demodulates the i precoded second pilot signal groups to obtain i second pilot signal groups respectively; and sends, to the transmit side according to the first pilot signal group and the i second pilot signal groups that are obtained, precoding feedback information used to recommend a precoding matrix for the transmit side to transmit data. This enables the transmit side to adaptively adjust, according to the precoding feedback information sent by the receive side, a precoding matrix used for data transmission, and further makes the precoding matrix used for data transmission match an actual data transmission channel. In this way, performance of a wireless communications system is improved.

The foregoing descriptions about implementations allow persons skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing apparatus, reference may be made to a corresponding process in the foregoing method embodiments, and details are not described herein.

In the several embodiments provided in this application, it should be understood that the disclosed apparatus and method may be implemented in other manners. For example, the described apparatus embodiments are merely for illustration. For example, the module or unit division is merely logical function division and may be other division in actual implementation. For example, multiple units or components may be combined or integrated into another apparatus, or some features may be ignored or not performed. In addition, the displayed or discussed mutual couplings or direct couplings or communication connections may be indirect couplings or communication connections by using some interfaces, apparatuses, or units, and may be connections in electronic, mechanical, or other forms.

The units described as separate parts may or may not be physically separate. Parts displayed as units may be one or more physical units. That is, they may be located in one place, or may be distributed on different places. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present invention. The foregoing storage medium includes: any medium that can store program code, such as a USB flash drive, a removable hard disk, a read-only memory (English: Read-Only Memory, ROM for short), a random access memory (English: Random Access Memory, RAM for short), a magnetic disk, or an optical disc.

The foregoing descriptions are merely specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method of precoding information collection, applied to a receive apparatus, wherein there are M data streams used for data transmission between the receive apparatus and a transmit apparatus, and M is an integer greater than 1, the method comprising:

receiving, by the receive apparatus, a precoded first pilot signal group sent by the transmit apparatus, and receiving i precoded second pilot signal groups sent by the transmit apparatus, wherein i is an integer greater than or equal to 1;

demodulating, by the receive apparatus, the precoded first pilot signal group to obtain a first pilot signal group, and demodulating the i precoded second pilot signal groups to obtain i second pilot signal groups respectively; and sending, by the receive apparatus, precoding feedback information to the transmit apparatus according to the first pilot signal group and the i second pilot signal groups, wherein the first pilot signal group comprises M first pilot signals, and the $i^{th}$ second pilot signal group comprises $A_i$ second pilot signals; and the sending, by the receive apparatus, precoding feedback information to the transmit apparatus according to the first pilot signal group and the i second pilot signal groups comprises:

obtaining, by the receive apparatus, signal quality of the M first pilot signals in the first pilot signal group, and obtaining signal quality of $$\sum_i A_i$$

second pilot signals in the i second pilot signal groups; and selecting, by the receive apparatus, B pilot signals according to signal quality of all of the first pilot signals and signal quality of all of the second pilot signals, and sending the precoding feedback information to the transmit apparatus according to the B pilot signals, wherein B is an integer that is greater than or equal to 1 and less than or equal to $$\sum_i A_i + M.$$

2. A receive apparatus, wherein there are M data streams used for data transmission between the receive apparatus and a transmit apparatus, and M is an integer greater than 1; and the receive apparatus comprising:

a receiver configured to receive a precoded first pilot signal group sent by the transmit apparatus, and receive i precoded second pilot signal groups sent by the transmit apparatus, wherein i is an integer greater than or equal to 1;

a processor configured to demodulate the precoded first pilot signal group received by the receiver to obtain a first pilot signal group, and demodulate the i precoded second pilot signal groups received by the receiver to obtain i second pilot signal groups respectively; and a transmitter configured to send precoding feedback information to the transmit apparatus according to the first pilot signal group and the i second pilot signal groups that are obtained by the processor, wherein the first pilot signal group comprises M first pilot signals, and the $i^{th}$ second pilot signal group comprises $A_i$ second pilot signals; and the transmitter is configured to obtain signal quality of the M first pilot signals in the first pilot signal group, and obtain signal quality of $$\sum_i A_i$$

second pilot signals in the i second pilot signal groups; and select B pilot signals according to signal quality of all of the first pilot signals and signal quality of all of the second pilot signals, and send the precoding feedback information to the transmit apparatus according to the B pilot signals, wherein B is an integer that is greater than or equal to 1 and less than or equal to $$\sum_i A_i + M.$$

* * * * *